(12) United States Patent
Jeon et al.

(10) Patent No.: US 10,724,252 B2
(45) Date of Patent: Jul. 28, 2020

(54) NON-POLYVINYL CHLORIDE RECYCLABLE ENVIRONMENT-FRIENDLY FLOORING MATERIAL HAVING EXCELLENT ABRASION-RESISTANCE AND DIMENSIONAL STABILITY

(71) Applicant: Nox Corporation, Seoul (KR)

(72) Inventors: Seung Ho Jeon, Suwon-si (KR); Jong Park, Yongin-si (KR); Sung Man Lee, Yongin-si (KR)

(73) Assignee: NOX CORPORATION, Seoul (KR)

( * ) Notice: Subject to any disclaimer, the term of this patent is extended or adjusted under 35 U.S.C. 154(b) by 221 days.

(21) Appl. No.: 16/071,053

(22) PCT Filed: Oct. 28, 2016

(86) PCT No.: PCT/KR2016/012216
§ 371 (c)(1),
(2) Date: Jul. 18, 2018

(87) PCT Pub. No.: WO2017/074087
PCT Pub. Date: May 4, 2017

(65) Prior Publication Data
US 2019/0024389 A1    Jan. 24, 2019

(30) Foreign Application Priority Data

Oct. 28, 2015  (KR) .................. 10-2015-0149907
Jan. 11, 2016  (KR) .................. 10-2016-0003238
Jan. 11, 2016  (KR) .................. 10-2016-0003247

(51) Int. Cl.
*B32B 3/00* (2006.01)
*E04F 15/10* (2006.01)
(Continued)

(52) U.S. Cl.
CPC ............ *E04F 15/107* (2013.01); *B32B 27/08* (2013.01); *B32B 27/10* (2013.01); *B32B 27/20* (2013.01);
(Continued)

(58) Field of Classification Search
CPC ......... B32B 27/20; B32B 27/40; B32B 29/00; C08L 75/04; C08L 33/08; E04F 15/105; E04F 15/107
See application file for complete search history.

(56) References Cited

U.S. PATENT DOCUMENTS

2010/0227132 A1    9/2010  Pierson et al.

FOREIGN PATENT DOCUMENTS

CN      203947729 U    11/2014
KR   1020050055566 A     6/2005
(Continued)

OTHER PUBLICATIONS

ISA Korean Intellectual Property Office, International Search Report Issued in Application No. PCT/KR2016/012216, dated Jan. 11, 2017, WIPO, 4 Pages.
(Continued)

*Primary Examiner* — Elizabeth E Mulvaney
(74) *Attorney, Agent, or Firm* — McCoy Russell LLP

(57) ABSTRACT

The present invention relates to a flooring material formed by sequentially accumulating a surface layer film, a printing layer and a back layer sheet. The surface layer film includes a thermoplastic polyurethane resin (A) having a Shore hardness of 40-80 D, a softening point of 100-150° C., and a light transmittance of greater than or equal to 90%. The back layer sheet includes a thermoplastic polyurethane resin (B) having a Shore hardness of 40-80 D and a softening point of 100-150° C.

18 Claims, 4 Drawing Sheets

(51) Int. Cl.
  *B32B 27/40* (2006.01)
  *C08J 3/12* (2006.01)
  *C08J 5/18* (2006.01)
  *C08K 5/00* (2006.01)
  *C08K 3/22* (2006.01)
  *C08K 3/00* (2018.01)
  *B32B 29/00* (2006.01)
  *C08L 33/08* (2006.01)
  *C08L 75/08* (2006.01)
  *B32B 27/08* (2006.01)
  *B32B 27/10* (2006.01)
  *B32B 27/20* (2006.01)
  *C08K 3/26* (2006.01)
  *C08K 3/34* (2006.01)

(52) U.S. Cl.
  CPC .............. *B32B 27/40* (2013.01); *B32B 29/00* (2013.01); *C08J 3/12* (2013.01); *C08J 5/18* (2013.01); *C08K 3/00* (2013.01); *C08K 3/22* (2013.01); *C08K 3/26* (2013.01); *C08K 3/34* (2013.01); *C08K 5/00* (2013.01); *C08L 33/08* (2013.01); *C08L 75/08* (2013.01); *E04F 15/105* (2013.01); *B32B 2250/02* (2013.01); *B32B 2250/03* (2013.01); *B32B 2250/04* (2013.01); *B32B 2250/05* (2013.01); *B32B 2250/24* (2013.01); *B32B 2264/0207* (2013.01); *B32B 2264/10* (2013.01); *B32B 2264/102* (2013.01); *B32B 2264/104* (2013.01); *B32B 2264/12* (2013.01); *B32B 2307/412* (2013.01); *B32B 2307/414* (2013.01); *B32B 2307/536* (2013.01); *B32B 2307/554* (2013.01); *B32B 2307/734* (2013.01); *B32B 2471/00* (2013.01); *C08J 2375/04* (2013.01); *C08K 3/346* (2013.01); *C08K 2003/265* (2013.01)

(56) References Cited

FOREIGN PATENT DOCUMENTS

| KR | 1020080030303 A | 4/2008 |
|---|---|---|
| KR | 1020080045436 A | 5/2008 |
| KR | 1020100001513 A | 1/2010 |
| KR | 20110026142 A | 3/2011 |
| KR | 1020130022727 A | 3/2013 |
| KR | 101302335 B1 | 8/2013 |
| KR | 101395714 B1 | 5/2014 |

OTHER PUBLICATIONS

"Elastollan TPU Technical Data Sheet—Elastollan 1195A," BASF Website, Available Online at http://www.elastollan.basf.us/pdf/1195A.pdf, Available as Early as Feb. 18, 2015, 4 pages.

"Thermoplastic Polyurethane Elastomers (TPU)," BASF Website, Available Online at http://www.polyurethanes.basf.com/pu/solutions/en/function/conversions:/publish/content/group/Arbeitsgebiete_und_Produkte/Thermoplastische_Spezialelastomere/sortiment/tpu_sort_en.pdf, Available as Early as Sep. 2016, 40 pages.

European Patent Office, Extended European Search Report Issued in Application No. 16860270.4, dated Aug. 19, 2019, Germany, 39 pages.

NON-POLYVINYL CHLORIDE RECYCLABLE ENVIRONMENT-FRIENDLY FLOORING MATERIAL HAVING EXCELLENT ABRASION-RESISTANCE AND DIMENSIONAL STABILITY

CROSS-REFERENCE TO RELATED APPLICATIONS

The present application is a U.S. National Phase of International Patent Application Serial No. PCT/KR2016/012216 entitled "NON-POLYVINYL CHLORIDE RECYCLABLE ENVIRONMENT-FRIENDLY FLOORING MATERIAL HAVING EXCELLENT ABRASION-RESISTANCE AND DIMENSIONAL STABILITY," filed on Oct. 28, 2016. International Patent Application Serial No. PCT/KR2016/012216 claims priority to Korean Patent Application No. 10-2015-0149907, filed on Oct. 28, 2015, Korean Patent Application No. 10-2016-0003238, filed on Jan. 11, 2016, and Korean Patent Application No. 10-2016-0003247, filed on Jan. 11, 2016. The entire contents of each of the above-cited applications are hereby incorporated by reference in their entirety for all purposes.

TECHNICAL FIELD

The present invention relates to a novel environment-friendly flooring material, and more particularly, to a novel flooring material formed of an environment-friendly material having excellent abrasion resistance and dimensional stability while simultaneously being a non-polyvinyl chloride (PVC) material to be capable of being recycled by extrusion processing at the time of disposal after being used.

BACKGROUND ART

A polyvinyl chloride (PVC)-based flooring material has been widely used in various buildings such as apartments, residential complexes, villas, row houses, detached houses, office buildings, shopping malls, shops, and pensions, etc.

In general, the PVC-based flooring material has a structure in which a surface layer PVC film, a middle layer PVC film including a printing layer, and a back layer PVC sheet are stacked, and has insufficient abrasion resistance but has advantages in that various patterns are capable of being implemented, dimensional stability is excellent, and economic efficiency is good. However, regarding the PVC, when a phthalate plasticizer widely known as an endocrine disruptor that is added in a large amount to impart flexibility, which is a so-called environmental hormone, is used for a flooring material, the plasticizer is eluted, which adversely affects safety of a human body. In addition, there is a serious problem in that a large amount of dioxin, a carcinogen, occurs at the time of incineration and disposal, and thus an environment-friendly flooring material formed of non-PVC (polyvinyl chloride) has been eagerly desired for a long time.

In addition, reduction of greenhouse gas emissions, which is the main cause of global warming, is being forced around the world, and thus countermeasures are urgently needed. Therefore, constitution in which a flooring material is not disposed by incineration, landfill, etc., after being used, but is formed in a pellet form by extrusion processing, which is a so-called recyclable UNI-material, is emerging as a very promising solution in view of enabling reduction of huge amount of greenhouse gas emissions.

In conclusion, an environment-friendly flooring material formed of a non-PVC material while simultaneously being formed of recyclable UNI-material is urgently needed.

In addition, conventional PVC-based flooring materials are poor in abrasion resistance, and thus in general, the poor abrasion resistance is reinforced by introducing a surface layer formed by coating and curing an ultraviolet (UV) curable resin. However, it is a cost increase factor, and due to a very thin thickness with a few μm, the conventional PVC-based flooring materials are easily worn out and are not able to stay long, and thus there are many inconveniences such as frequent waxing, etc., by consumers to compensate. If the material is replaced with a material that is not fundamentally UV-coated but has excellent abrasion resistance compared to the conventional PVC flooring materials, even if cost of the flooring material rises somewhat, a replacement cycle becomes longer, and thus economic efficiency may be rather excellent. From this point of view, it is urgently required to develop a floor material composed of a material excellent in abrasion resistance.

In addition, dimensional stability should be definitely considered when designing a new flooring material. The dimensional stability may be generally deteriorated due to expansion, shrinkage, or the like due to environmental factors such as external temperature and humidity, etc. A phenomenon frequently occurs in that a connection part between the flooring materials becomes open due to shrinkage or that a surface of the flooring material rises like a wave due to expansion, and thus it is difficult to use the material continuously and stably. Further, in the conventional flooring materials in which multilayer films or sheets are stacked, there may be a serious problem that a shape of the flooring material is distorted since coefficients of thermal expansion for interlayer films or sheets are different.

As a solution to the above-described problem, a flooring material that is stacked based on a biomass biodegradable resin such as polylactic acid as a non-PVC material has been proposed as disclosed in Korean Patent No. 10-1302335. However, since a fiber-reinforced resin layer sheet formed of heterogeneous materials having poor abrasion resistance and reinforced dimensional stability is inserted, there is a disadvantage in that recycling by extrusion processing at the time of disposal is impossible.

In addition, as described in Korean Patent No. 10-1395714, a flooring material stacked based on a polyolefin resin as a non-PVC material has been proposed. However, since a polyolefin resin used in an upper layer has very poor abrasion resistance compared to conventional PVCs, a glass fiber impregnated with a thermosetting polyurethane resin, which is a heterogeneous material, is used in a dimensional stability reinforcing layer, is used, and a thermosetting heterogeneous material is used in an UV coating layer, there is a disadvantage in that recycling by extrusion processing at the time of disposal is impossible.

Further, as described in Korean Patent No. 10-0600841, a flooring material stacked based on a thermoplastic polyurethane resin which is expensive but has relatively excellent abrasion resistance as a non-PVC material has been proposed. However, in the case of the thermoplastic polyurethane resin, when a film and a sheet are formed by a calendering method, processing is very difficult since a resin adheres to a metal roll, and thus a softener such as oil, or the like, is added to solve this problem. However, since the softener has a low molecular weight, it is very likely to be slowly eluted when used as a flooring material. In addition, interlayer thermal stability is changed due to a change in the composition caused thereby, and thus there is a great concern that the dimensional stability may gradually decrease. In addition, to compensate for this, a dimensional stability reinforcing layer using a glass fiber impregnated with a thermosetting polyurethane resin as a heterogeneous material is introduced, and a softener is added but causes excessive softness, which deteriorates abrasion resistance. In order to compensate for this, an ultraviolet coating layer using a thermosetting heterogeneous material is also introduced, which makes it impossible to recycle by extrusion processing at the time of disposal, and also there is disadvantage in that economic efficiency is very weak due to many multilayer structures.

As described above, the environment-friendly flooring material formed of non-PVC material has been continuously researched and developed, but a dimensional stability reinforcing layer and a UV curable coating layer formed of heterogeneous materials have been introduced since there are no materials excellent in abrasion resistance, dimensional stability and molding processability at the same time, and thus the flooring material is not able to be recycled by extrusion processing after disposal. As a result, since excessive amounts of sheets or films are stacked to manufacture the flooring material, the economic efficiency is deteriorated, and thus it is very urgently required to have a breakthrough method for solving these problems at one time.

DISCLOSURE

Technical Problem

In order to solve the above problems, the present inventor conducted continuous researches, and as a result, completed the present invention.

An object of the present invention is to provide a novel flooring material formed of an environment-friendly material having abrasion resistance, dimensional stability, molding processability, and economic efficiency while simultaneously being a non-PVC material obtained therefrom and being capable of being recycled by extrusion processing at the time of disposal after being used.

Technical Solution

In one general aspect, there is provided a non-polyvinyl chloride recyclable environment-friendly flooring material having excellent abrasion resistance and dimensional stability.

There is provided the environment-friendly flooring material formed by sequentially stacking a surface layer film, a printing layer, and a back layer sheet from an upper part, wherein the surface layer film includes a thermoplastic polyurethane resin (A) having a Shore hardness of 40 D to 80 D, a softening point of 100° C. to 150° C., and a light transmittance of 90% or more, and the back layer sheet includes a thermoplastic polyurethane resin (B) having a Shore hardness of 40 D to 80 D and a softening point of 100° C. to 150° C.

The surface layer film and the back layer sheet may further include any one or a mixture of two or more selected from a copolymer having a core-shell structure in which a core is an elastic body and a shell is formed of an acrylic resin, an inorganic particle, and an organic particle.

The elastic body may be rubber or elastomer.

The elastic body may be any one or two or more selected from the group consisting of butadiene rubber, styrene-butadiene rubber, styrene-butadiene-styrene, acrylonitrile rubber, acrylonitrile-butadiene rubber, butyl acrylate rubber, ethylene-propylene-diene rubber, ethylene-propylene rubber, and styrene-propylene rubber.

The acrylic resin may be an acrylic polymer including an acrylic monomer alone or an aromatic vinyl compound-acrylic copolymer including 60 to 99.9 mol % of the acrylic monomer and 0.1 to 40 mol % of an aromatic vinyl compound.

The acrylic monomer may be any one or two or more selected from the group consisting of methyl methacrylate, methyl acrylate, ethyl methacrylate, ethyl acrylate, ethylhexyl acrylate, methyl ethacrylate, ethyl ethacrylate, isopropyl methacrylate, isopropyl acrylate, propyl methacrylate, propyl acrylate, isobutyl methacrylate, isobutyl acrylate, butyl methacrylate, butyl acrylate, and 2-hydroxyethyl methacrylate.

The aromatic vinyl compound may be any one or two or more selected from the group consisting of styrene, p-chlorostyrene, p-tert-butylstyrene, α-methylstyrene, p-methylstyrene, vinylnaphthalene and vinylanthracene.

The copolymer having a core-shell structure may have an average particle size of 10 to 10,000 nm.

The copolymer having a core-shell structure may have a refractive index of 1.5 to 1.6.

The inorganic particle may be selected from the group consisting of talc, calcium carbonate, clay, kaolin, silica, diatomaceous earth, magnesium carbonate, calcium chloride, calcium sulfate, aluminum hydroxide, zinc oxide, magnesium hydroxide, titan dioxide, alumina, mica, asbestos, zeolite, silicate clay, glass fiber, and whisker.

The organic particle may be any one or two or more selected from the group consisting of wood powder, rice hull powder, paper powder, and cellulose-based natural fiber powder.

The environment-friendly flooring material may further include an intermediate layer between the printing layer and the back layer sheet, and the intermediate layer may include a film including the thermoplastic polyurethane resin (B) having a Shore hardness of 40 D to 80 D and a softening point of 100° C. to 150° C. and an inorganic particle; paper; or a thermoplastic polyurethane-based resin composition including the thermoplastic polyurethane resin (B) and a copolymer having a core-shell structure in which a core is an elastic body and a shell is formed of an acrylic resin.

The paper may be selected from vellum paper, art paper, snow white, tissue paper, graft paper, titan paper, linter paper, Wood-free Paper, medium quality paper, coated paper, sheepskin paper, and Japanese paper.

The surface layer film and the intermediate layer may be manufactured by an inflation molding method or a T-die casting method.

The environment-friendly flooring material may further include a reflective layer between the printing layer and the intermediate layer.

The thermoplastic polyurethane resin may be any one or two or more selected from the group consisting of an ester-based thermoplastic polyurethane resin, an ether-based thermoplastic polyurethane resin, and a carbonate-based thermoplastic polyurethane resin.

The back layer sheet may be a single layer sheet or a multilayer sheet stacked in two or more layers.

The back layer sheet may be manufactured by a T-die casting method.

The environment-friendly flooring material may further include a reflective layer between the printing layer and the back layer sheet.

In another general aspect, there is provided a thermoplastic polyurethane-based resin composition including: a thermoplastic polyurethane resin and a copolymer having a core-shell structure in which a core is an elastic body and a shell is formed of an acrylic resin.

The thermoplastic polyurethane-based resin composition may include 5 to 100 parts by weight of the copolymer having a core-shell structure based on 100 parts by weight of the thermoplastic polyurethane resin.

Advantageous Effects

The environment-friendly flooring material according to the present invention is a flooring material formed by sequentially stacking a surface layer film, a printing layer, and a backing layer sheet, and having excellent abrasion resistance and dimensional stability while simultaneously being a non-PVC material, and thus there is no concern about elution of environmental hormone and dioxin emission at the time of incineration. In addition, the flooring material is a novel flooring material formed of an environment-friendly material capable of being recycled by extrusion processing at the time of disposal after being used. The flooring material is expected to be very useful as a flooring material for various buildings such as apartments, residential complexes, villas, row houses, detached houses, office buildings, shopping malls, shops, and pensions, etc. In particular, in the flooring material according to the present invention, when manufacturing the intermediate layer used as a film layer for printing, a non-PVC material or paper which is inexpensive and recyclable may be used, or the printing layer may be formed on one surface of the surface layer film, and the intermediate layer may be removed, thereby further improving economic efficiency and environment-friendliness of the flooring material.

DETAILED DESCRIPTION OF MAIN ELEMENTS

Figure 1:
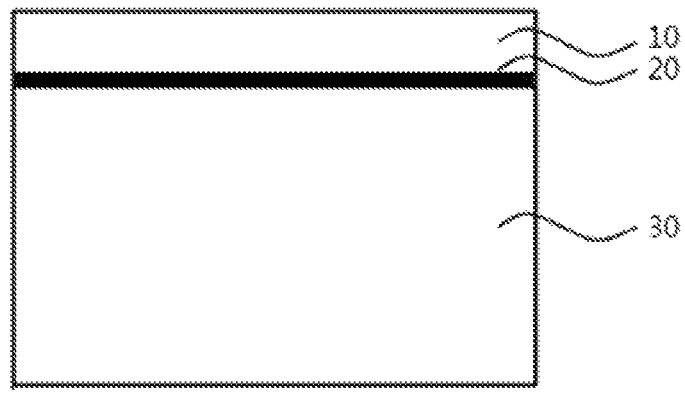
FIG. 1 is a partial cross-sectional view showing a first exemplary embodiment of an environment-friendly flooring material of the present invention.

10: surface layer film
20: printing layer
30: back layer sheet 30(a): back layer upper sheet 30(b): back layer lower sheet
40: intermediate layer
50: reflective layer

BEST MODE

Hereinafter, the present invention will be described in detail. In describing the present invention, a detailed description of related known functions or configurations will be omitted so as not to obscure the subject of the present invention.

An environment-friendly flooring material of the present invention is a novel flooring material formed of an environment-friendly material having excellent abrasion resistance and dimensional stability while simultaneously including a non-PVC material to be capable of being recycled by extrusion processing at the time of disposal after being used, and has following good advantages.

First, the environment-friendly flooring material of the present invention is designed in the form of a flooring material including a non-PVC thermoplastic uni-material and having a laminate structure in which three or six layers of films or sheets including a printing layer are stacked as a film or a sheet, thereby being capable of being recycled to be environment-friendly. Since the environment-friendly flooring material of the present invention uses a thermoplastic polyurethane resin as a surface layer film material in a flooring material having a laminate structure, a replacement cycle of the flooring material greatly increases due to high abrasion resistance compared to the PVC. Therefore, the present invention is created based on the idea that the environment-friendly flooring material has excellent economic efficiency compared to a PVC flooring material considering an installation construction cost.

Further, the environment-friendly flooring material of the present invention may have maximized abrasion resistance and excellent film or sheet processability by selecting a base resin of a non-PVC uni-material, i.e., a thermoplastic polyurethane resin having a Shore hardness and a softening point within a specific range as a constituent element of the present invention. In the prior art, the flooring material is manufactured by adopting a polyolefin resin as a non-PVC uni-material in a constitution. However, the flooring material manufactured by including the non-PVC uni-material is very poor in abrasion resistance. Even though a polyolefin elastomer is added to improve the poor abrasion resistance, an effect of improving the abrasion resistance is insignificant. However, in the present invention, it is possible to manufacture a flooring material having high abrasion resistance by introducing a constitution in which a thermoplastic polyurethane resin having a Shore hardness and a softening point within a specific range is used and stacked as a base resin of a non-PVC uni-material, and a replacement cycle of the flooring material increases due to high abrasion resistance of the flooring material, and thus it is possible to obtain excellent economic efficiency.

Further, the environment-friendly flooring material of the present invention may have excellent walking feeling and abrasion resistance by introducing the thermoplastic polyurethane resin having an appropriate range of hardness and high light transmittance as a material of the surface layer film. Accordingly, it is possible to omit an additional UV coating process for improving the abrasion resistance of the surface of the flooring material, which is included in the conventional technology, and thus excellent economic efficiency in time and cost may be obtained. At the same time, a printed state of the printing layer, which is a constituent of the flooring material, may be clearly seen.

Further, the flooring material of the present invention may be manufactured by introducing a thermoplastic polyurethane resin having a high hardness and a high softening point within a specific range as a material of the surface layer film, the intermediate layer, and the back layer sheet, thereby having excellent processability, thermal resistance, and walking feeling, while simultaneously having excellent abrasion resistance and dimensional stability that are opposite properties.

Further, the flooring material of the present invention may be manufactured by introducing a composition in which fine inorganic particles within a content range ensuring film and sheet processability are added to the thermoplastic polyurethane resin as the material for the intermediate layer and the back layer sheet, thereby maximizing processability, heat resistance, mechanical properties, and dimensional stability. Through an effect of maximizing the mechanical properties and dimensional stability, the use of an expensive thermosetting resin-impregnated glass fiber reinforced resin layer sheet that is conventionally used for imparting dimensional stability in the related art technology may be omitted, and thus it is possible to obtain a remarkable economic efficiency improvement effect according to the reduction in a material cost.

In addition, in the flooring material of the present invention, when manufacturing the intermediate layer used as a film layer for printing, a non-PVC material or paper which is inexpensive and recyclable may be used, or the printing layer may be formed on one surface of the surface layer film, and the intermediate layer may be removed, thereby further improving economic efficiency and environment-friendliness of the flooring material.

Further, the environment-friendly flooring material of the present invention greatly improves film or sheet molding processability and economic efficiency, which is a disadvantage of the thermoplastic polyurethane resin. In addition, a copolymer having a core-shell structure in which a core is an elastic body and a shell is formed of an acrylic resin and being in a fine particle state in which the abrasion resistance and the dimensional stability are capable of being further improved, may be selected as a resin to be mixed and used together. The shell of the copolymer is formed of the acrylic resin to be highly compatible with the thermoplastic polyurethane resin, thereby being well dispersed uniformly, and has a high surface hardness, and thus the abrasion resistance is remarkably improved as an addition amount thereof increases. In addition, an elastic body component of the core serves to maintain or improve high elasticity toughness which is an advantage of the thermoplastic polyurethane resin. Further, it is found that since the copolymer having the core-shell structure are fine particles, when the film or sheet is molding processed, very fine protrusions are formed on the surface to prevent from adhering to a metal roll surface, and thus the film or sheet molding processability may be surprisingly excellent. In addition, the copolymer having the core-shell structure is inexpensive as compared to the thermoplastic polyurethane resin, and economic efficiency may be greatly improved.

In addition, when the copolymer having a core-shell structure has a refractive index of 1.5 to 1.6 in the environment-friendly flooring material of the present invention, the above refractive index is similar to that of the thermoplastic polyurethane resin, and thus it is possible to form a very transparent film or sheet. In particular, when a particle size of the copolymer having the core-shell structure is adjusted to have a nano size of 10 to 500 nm, the transparency may be further improved. The thermoplastic polyurethane-based resin composition is very suitable as a raw material for a surface layer film which is excellent in transparency, abrasion resistance, dimensional stability, molding processability, and economic efficiency in the floor material which is, for example, formed by stacking a surface layer film, a printing layer, an intermediate layer, and a back layer sheet.

Further, the environment-friendly flooring material of the present invention includes a thermoplastic polyurethane resin and a copolymer having a core-shell structure in which the core is an elastic body and the shell is formed of an acrylic resin, and when an inorganic particle or an organic particle is further added, dimensional stability and molding processability may be further improved. Moreover, the inorganic or organic particle is very inexpensive to remarkably improve economic efficiency. It is found that in the flooring material which is, for example, formed by stacking the surface layer film, the printing layer, the intermediate layer, and the back layer sheet, the thermoplastic polyurethane-based resin composition is very suitable as a raw material for the intermediate layer or the back layer sheet in which dimensional stability, arrival safety, economic efficiency, etc., are particularly required without requiring transparency, and completed the present invention.

Hereinafter, constitution of the present invention will be described in detail with reference to the accompanying drawings. The drawings of the present invention below are provided by way of example so that the idea of the present invention can be sufficiently transferred to those skilled in the art to which the present invention pertains. Therefore, the present invention may be implemented in different forms, without being limited to the drawings to be shown below. The drawings below may be exaggerated in order to specify the spirit of the present invention. Here, unless technical and scientific terms used herein are defined otherwise, they have meanings understood by those skilled in the art to which the present invention pertains. Description of known functions and components that may obscure the gist of the present invention will be omitted from the following description and the accompanying drawings.

Hereinafter, the exemplary embodiments of the present invention are described in detail with reference to the drawings, but the present invention is not limited thereto.

As shown in FIG. 1, a first embodiment of the present invention is shown. In an embodiment of the present invention, a flooring material may be composed of a surface layer film 10, a printing layer 20, and a back layer sheet 30.

A method of stacking the surface layer film 10, the printing layer 20, and the back layer sheet 30 according to the present invention is not particularly limited, but each layer film and sheet may include the same thermoplastic polyurethane resin component to be easily stacked by using the most efficient conventional thermal fusion type film (sheet) laminator in view of cost.

Figure 2:
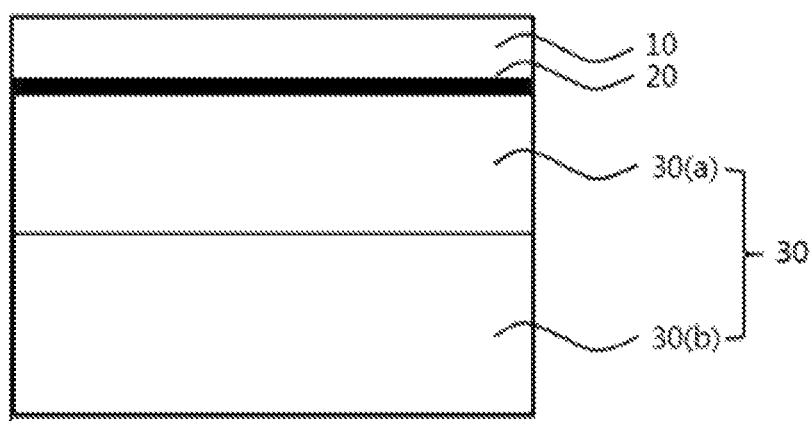
FIG. 2 is a partial cross-sectional view showing a second exemplary embodiment of an environment-friendly flooring material of the present invention.

As an example for balancing warpage, an example of the flooring material according to the present invention is shown in FIG. 2. In the present embodiment, the flooring material may be composed of the surface layer film 10, the printing layer 20, and the back layer sheet 30, wherein the back layer sheet 30 may be composed of a back layer upper sheet 30(*a*) and a back layer lower sheet 30(*b*).

In this case, first, the surface layer film 10, the printing layer 20 and the back layer upper sheet 30(*a*) may be stacked through heat fusion to manufacture the flooring material, a warpage state may be examined, and contents of the thermoplastic polyurethane resin and any one or a mixture of two or more selected from a copolymer having a core-shell structure in which a core is an elastic body and a shell is formed of an acrylic resin, an inorganic particle, and an organic particle, may be controlled to manufacture the back layer lower sheet 30(b), and then stacked with the previously laminated flooring material, thereby obtaining a final desired flooring material.

Figure 3:
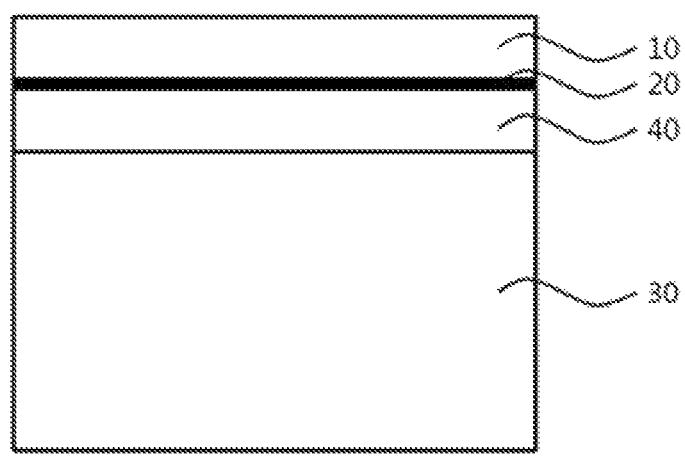
FIG. 3 is a partial cross-sectional view showing a third exemplary embodiment of an environment-friendly flooring material of the present invention.

An exemplary embodiment of another flooring material according to the present invention is shown in FIG. 3.

As an example for increasing printability, in the present embodiment, the flooring material may be composed of the surface layer film 10, the printing layer 20, and the back layer sheet 30. The environment-friendly flooring material may further include an intermediate layer 40 between the printing layer 20 and the back layer sheet 30.

Figure 4:
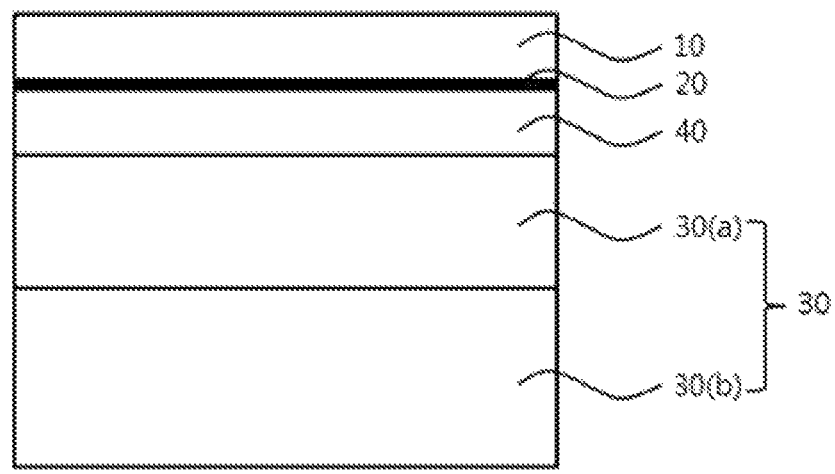
FIG. 4 is a partial cross-sectional view showing a fourth exemplary embodiment of an environment-friendly flooring material of the present invention.
Figure 5:
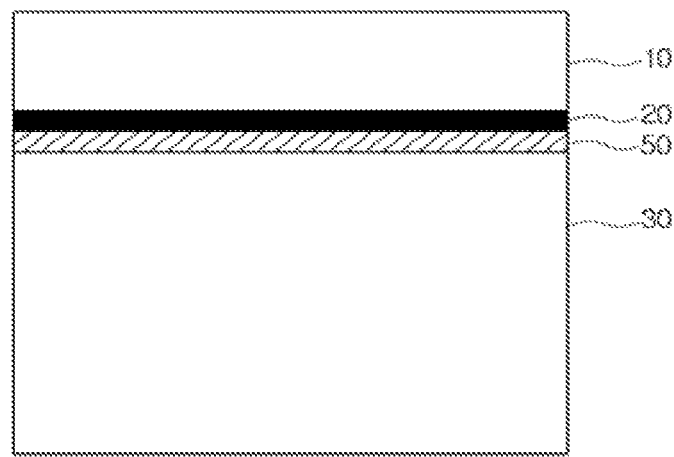
FIG. 5 is a partial cross-sectional view showing a fifth exemplary embodiment of an environment-friendly flooring material of the present invention.
Figure 6:
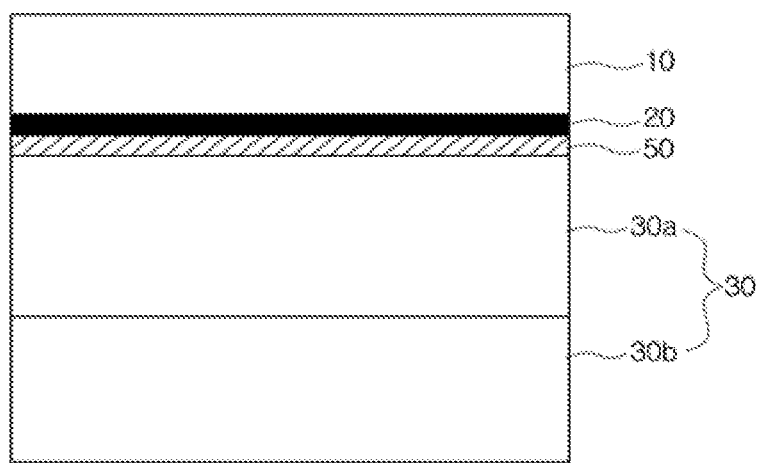
FIG. 6 is a partial cross-sectional view showing a sixth exemplary embodiment of an environment-friendly flooring material of the present invention.
Figure 7:
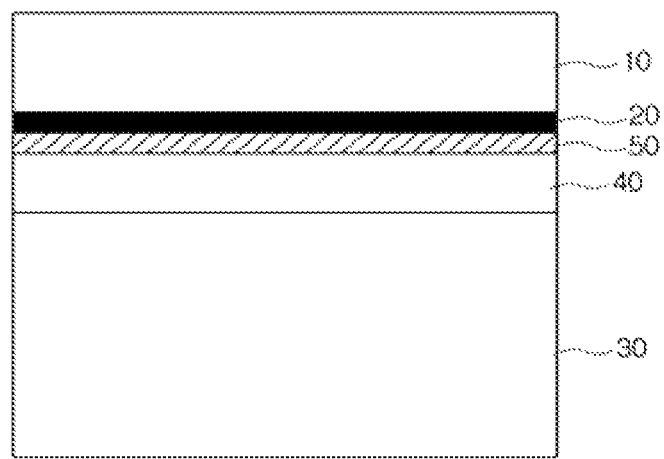
FIG. 7 is a partial cross-sectional view showing a seventh exemplary embodiment of an environment-friendly flooring material of the present invention.
Figure 8:
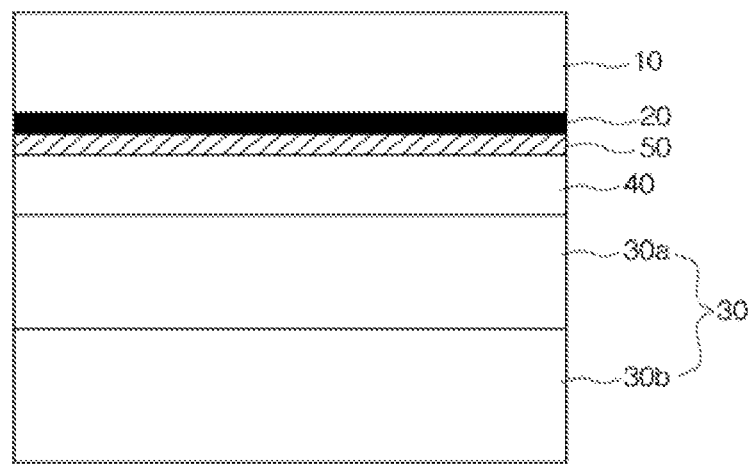
FIG. 8 is a partial cross-sectional view showing an eighth exemplary embodiment of an environment-friendly flooring material of the present invention.

In FIG. 4 of another exemplary embodiment of the flooring material according to the present invention, the intermediate layer is also included to improve printability with respect to an exemplary embodiment of FIG. 3.

In addition, according to exemplary embodiments shown in FIGS. 4 to 8 in the present invention, the environment-friendly flooring material of the present invention may further include a reflective layer 50 between the printing layer 20 and the intermediate layer 40 or between the printing layer 20 and the back layer sheet 30.

The reflective layer 50 is a layer for minimizing a phenomenon in which colors of the intermediate layer and the back layer sheet are transmitted and a pattern to be printed is blurred, and may include a white printing layer, a metal layer, and the like, but is not specifically limited thereto. Further, by including the reflective layer in the above-described position, it is preferable since a manufacturing efficiency of the floor material having a clear pattern is improved.

Printing on the reflective layer of the present invention may be performed by conventional gravure printing, screen printing, offset printing, rotary printing, flexographic printing, etc., but is not specifically limited thereto.

In the present invention, the environment-friendly flooring material according to the present invention is a flooring material formed by stacking the surface layer film, the printing layer, and the back layer sheet, wherein the surface layer film includes a thermoplastic polyurethane resin (A) having a Shore hardness of 40 D to 80 D, a softening point of 100° C. to 150° C., and a light transmittance of 90% or more, and the back layer sheet includes a thermoplastic polyurethane resin (B) having a Shore hardness of 40 D to 80 D and a softening point of 100° C. to 150° C.

In the present invention, the thermoplastic polyurethane resin may be any one or two or more selected from the group consisting of an ester-based thermoplastic polyurethane resin, an ether-based thermoplastic polyurethane resin, and a carbonate-based thermoplastic polyurethane resin, and may include a thermoplastic polyurethane resin manufactured by a chemical synthesis method or a thermoplastic polyurethane resin derived from biomass. Preferably, an ester-based thermoplastic polyurethane resin having relatively high abrasion resistance may be used, but is not particularly limited thereto. Specific examples of the thermoplastic polyurethane-based resin that is usable in the present invention include Elastollan manufactured by BASF, Pearlthane, Estane and Pellethane manufactured by Lubrizol, Desmopan manufactured by Bayer MaterialScience, Irogran and Avalon manufactured by Huntsman, New Power manufactured by New Power Industrial, Exelast manufactured by Shin-Etsu Polymer, and Miractran manufactured by Nippon Miractran, etc., but the thermoplastic polyurethane resin is not particularly limited thereto.

The present invention will be described in more detail.

The present invention relates to a flooring material formed by sequentially stacking a surface layer film, a printing layer, and a back layer sheet from an upper part, wherein the surface layer film includes a thermoplastic polyurethane resin (A) having a Shore hardness of 40 D to 80 D, a softening point of 100° C. to 150° C., and a light transmittance of 90% or more, and the back layer sheet includes a thermoplastic polyurethane resin (B) having a Shore hardness of 40 D to 80 D and a softening point of 100° C. to 150° C.

The thermoplastic polyurethane resin (A) used in the surface layer film of the present invention preferably has a Shore hardness of 40 D to 80 D, more preferably 45 D to 70 D. When the Shore hardness is in the above-described range, it is preferable since the abrasion resistance may be maximized, and walking feeling of the flooring material is good.

In addition, the thermoplastic polyurethane resin (A) of the present invention may have a softening point of 100 to 150° C., preferably 110 to 140° C. When the softening point is in the above-described range, it is preferable since the dimensional stability at the time of manufacturing the flooring material may be improved, and walking feeling at a suitable hardness is good.

In addition, the thermoplastic polyurethane resin (A) of the present invention may have a light transmittance of 90% or more, preferably a light transmittance of 92% or more. When the thermoplastic polyurethane resin having a light transmittance of 90% or more is used in the surface layer film of the present invention, it is preferable since the printed appearance of the printing layer is clearly visible.

Accordingly, when the thermoplastic polyurethane resin (A) used in the surface layer film of the present invention simultaneously satisfies the Shore hardness range, the softening point range and the light transmittance as described above, it is preferable since desired excellent abrasion resistance, dimensional stability and print visibility may be ensured. Specific examples of the thermoplastic polyurethane resin (A) that satisfies these conditions to be preferably usable as the surface layer film in the present invention include Elastollan 1195A10 (shore hardness of 53 D or 95 A, softening point of 116° C., light transmittance of 93%) manufactured by BASF, Estane R190A (shore hardness of 47 D or 93 A, softening point of 125° C., light transmittance of 93%), Estane L194A (shore hardness of 52 D or 94 A, softening point of 130° C., light transmittance of 93%), Estane S198A (shore hardness of 55 D or 98 A, softening point of 143° C., light transmittance of 92%), Estane S1364 D (shore hardness of 65 D or 98 A, softening point of 123° C., light transmittance of 92%), Estane S1364 D (shore hardness of 65 D, softening point of 123° C., light transmittance of 92%), Estane S375 D (shore hardness of 78 D, softening point of 130° C., light transmittance of 92%), Pearlthane ECO D12T55 D (shore hardness of 55 D, softening point of 133° C., light transmittance of 92%), Pearlthane ECO D12T85 (shore hardness of 42 D or 85 A, softening point of 111° C., light transmittance of 93%), Pearlthane ECO 12T95 (shore hardness of 50 D or 95 A, softening point of 107° C., light transmittance of 92%) manufactured by Lubrizol, etc., but the thermoplastic polyurethane resin (A) is not particularly limited thereto.

The surface layer film and the back layer sheet of the present invention may be manufactured by a general inflation molding method, a T-die casting method, or the like, but is not particularly limited thereto. In particular, when massproducing a surface layer film having a thick thickness, the T-die casting method is preferably performed, but it is not particularly limited.

The surface layer film of the present invention may have a thickness of 50 to 500 μm, preferably 100 to 300 μm, but is not limited thereto. When the surface layer film is manufactured within the above-described range, it is preferable since sufficient abrasion resistance of the flooring material may be secured, and cost competitiveness may be provided.

According to an exemplary embodiment of the present invention, the surface layer film and the back layer sheet may further include any one or a mixture of two or more selected from a copolymer having a core-shell structure in which a core is an elastic body and a shell is formed of an acrylic resin, an inorganic particle, and an organic particle.

According to an exemplary embodiment of the present invention, the surface layer film and the back layer sheet may include a thermoplastic polyurethane-based resin composition including: a thermoplastic polyurethane resin and a copolymer having a core-shell structure in which a core is an elastic body and a shell is formed of an acrylic resin.

According to an exemplary embodiment of the present invention, the surface layer film and the back layer sheet preferably further include 5 to 100 parts by weight of the copolymer having a core-shell structure based on 100 parts by weight of the thermoplastic polyurethane resin. More preferably, the surface layer film and the back layer sheet further include 10 to 70 parts by weight of the copolymer having a core-shell structure, but is not particularly limited thereto. When the copolymer having the core-shell structure is included within the above-described range, it is preferable to have an effect of improving abrasion resistance, dimensional stability, molding processability, and economic efficiency.

The elastic body may be rubber or elastomer.

The elastic body may be any one or two or more selected from the group consisting of butadiene rubber, styrene-butadiene rubber, styrene-butadiene-styrene rubber, acrylonitrile rubber, acrylonitrile-butadiene rubber, butyl acrylate rubber, ethylene-propylene-diene rubber, ethylene-propylene rubber, and styrene-propylene rubber.

The copolymer having the core-shell structure of the present invention is a high-elasticity organic polymer particle, which is more elastic than the thermoplastic urethane resin, and is in the form of a fine particle to have good adhesion-preventing property to a metal roll, thereby having excellent calendering processability. In addition, the cost is low compared to the thermoplastic polyurethane resin, which is preferred in view of economic efficiency.

The acrylic resin may be an acrylic polymer including an acrylic monomer alone or an aromatic vinyl compound-acrylic copolymer including 60 to 99.9 mol % of the acrylic monomer and 0.1 to 40 mol % of an aromatic vinyl compound.

The acrylic monomer may be any one or two or more selected from the group consisting of methyl methacrylate, methyl acrylate, ethyl methacrylate, ethyl acrylate, ethylhexyl acrylate, methyl ethacrylate, ethyl ethacrylate, isopropyl methacrylate, isopropyl acrylate, propyl methacrylate, propyl acrylate, isobutyl methacrylate, isobutyl acrylate, butyl methacrylate, butyl acrylate, and 2-hydroxyethyl methacrylate.

The aromatic vinyl compound may be any one or two or more selected from the group consisting of styrene, p-chlorostyrene, p-tert-butylstyrene, α-methylstyrene, p-methylstyrene, vinylnaphthalene and vinylanthracene.

Specific examples of the copolymer having the core-shell structure include IM808A, IM810, IM812, EM500, EM505, and the like, manufactured by LG Chem., Ltd., but the copolymer having the core-shell structure is not particularly limited thereto.

According to an exemplary embodiment of the present invention, the copolymer having the core-shell structure is preferably a particle having an average particle diameter of 10 to 10,000 nm, preferably 20 to 5,000 nm. In particular, when transparency is required, nanoparticles having an average particle size of 30 to 500 nm are preferable.

According to an exemplary embodiment of the present invention, the copolymer having the core-shell structure does not have any particular limitation on the refractive index in ensuring abrasion resistance, dimensional stability and molding processability in the flooring material. However, in application of a film or a sheet requiring transparency, the refractive index of the copolymer having the core-shell structure is preferably 1.5 to 1.6. More preferably, the refractive index of the copolymer having the core-shell structure may be 1.53 to 1.57, but is not limited thereto. When the copolymer having the core-shell structure having a refractive index within the above-described range is used, excellent transparency may be exhibited since the refractive index is very similar to that of the thermoplastic polyurethane resin (A). For example, in the flooring material formed by stacking the surface layer film, the printing layer, the intermediate layer and the back layer sheet, the copolymer having the core-shell structure is highly suitable as a raw material for the surface layer film requiring high transparency as well as abrasion resistance, dimensional stability, molding processability and economic efficiency. Specific examples of the copolymer having the core-shell structure include a copolymer EM700 having a core-shell structure in which a core is a styrene-butadiene rubber and a shell is formed of a polymethyl methacrylate resin manufactured by LG Chem., Ltd., a copolymer EM900 having a core-shell structure in which a core is a butylacrylate rubber and a shell is formed of a polymethyl methacrylate resin manufactured by LG Chem., Ltd., but the copolymer having the core-shell structure is not specifically limited thereto.

According to an embodiment of the present invention, the surface layer film and the back layer sheet preferably further include 10 to 500 parts by weight of an inorganic particle or an organic particle based on 100 parts by weight of the thermoplastic polyurethane resin. More preferably, the surface layer film and the back layer sheet further include 30 to 400 parts by weight of an inorganic particle or an organic particle, but is not particularly limited thereto. When the inorganic particle or the organic particle is included within the above-described range, dimensional stability and molding processability may be further improved. Further, since the inorganic or organic particle is very inexpensive, economic efficiency is remarkably improved, and thus it is more suitable as a raw material for the intermediate layer or the back layer sheet in which dimensional stability, arrival stability, economic efficiency, etc., are particularly required without requiring transparency in the flooring material which is, for example, formed by stacking the surface layer film, the printing layer, the intermediate layer, and the back layer sheet.

According to an embodiment of the present invention, the inorganic particle may be selected from the group consisting of talc, calcium carbonate, clay, kaolin, silica, diatomaceous earth, magnesium carbonate, calcium chloride, calcium sulfate, aluminum hydroxide, zinc oxide, magnesium hydroxide, titanium dioxide, alumina, mica, asbestos, zeolite, silicate clay, glass fiber, and whisker, etc., but particularly, talc and calcium carbonate are the most preferred since they are particularly inexpensive and effective for increasing thermal resistance dimensional stability, but are not limited thereto.

A shape of the inorganic particle used according to an embodiment of the present invention may be any type such as spherical type, needle type, plate type, or the like, and the inorganic particle may have an average particle size of 10 to 10,000 nm. Preferably, the inorganic particle has an average particle size of 100 to 5,000 nm.

According to an embodiment of the present invention, the organic particle may be cellulose-based natural fiber powder such as wood powder, rice hull powder, paper powder, yam, hemp, jute, kenaf, abaca, bamboo, coir, pineapple, ramie fabric, sisal, henequen, or the like, but preferably, the wood powder and the rice hull powder are the most preferable since they are extremely inexpensive and effective for increasing thermal resistance dimensional stability, but are not particularly limited thereto.

A shape of the organic particle used according to an embodiment of the present invention may be any type such as spherical type, needle type, plate type, or the like, and the organic particle may have an average particle size of 100 to 10,000 nm. Preferably, the organic particle has an average particle size of 500 to 5,000 nm.

Printing on the surface layer film according to the present invention may impart aesthetics of the flooring material by forming patterns by various methods such as general gravure printing, screen printing, offset printing, rotary printing, and flexographic printing, etc., but is not particularly limited thereto.

According to an exemplary embodiment of the present invention, as shown in FIGS. 3 to 4 and 7 to 8, the environment-friendly flooring material may further include an intermediate layer between the printing layer and the back layer sheet, and the intermediate layer may include a film including the thermoplastic polyurethane resin (B) having a Shore hardness of 40 D to 80 D and a softening point of 100° C. to 150° C. and an inorganic particle; paper; or a thermoplastic polyurethane-based resin composition including the thermoplastic polyurethane resin (B) and a copolymer having a core-shell structure in which a core is an elastic body and a shell is formed of an acrylic resin.

According to an exemplary embodiment of the present invention, the paper may be selected from vellum paper, art paper, snow white, tissue paper, graft paper, titan paper, linter paper, Wood-free Paper, medium quality paper, coated paper, sheepskin paper, and Japanese paper.

The present invention is composed of 3 to 6 layers of sheets in order to overcome problems of a large number of quality defect factors and cost increase through a process of stacking excessive number of sheets as a disadvantage of the existing environment-friendly flooring material. When manufacturing the intermediate layer used as a film layer for printing, a non-PVC material or paper which is inexpensive and recyclable may be used, or the printing layer may be formed on one surface of the surface layer film, and the intermediate layer may be removed, thereby further improving economic efficiency and environment-friendliness of the flooring material. By using the material of the intermediate layer in the present invention, thermal resistance dimensional stability of the flooring material may be enhanced. Further, by using very inexpensive inorganic particles, improvement of economic efficiency may be ensured.

According to an exemplary embodiment of the present invention, the intermediate layer may include a thermoplastic polyurethane-based resin composition including: a thermoplastic polyurethane resin and a copolymer having a core-shell structure in which a core is an elastic body and a shell is formed of an acrylic resin.

According to an exemplary embodiment of the present invention, the thermoplastic polyurethane resin-based composition preferably further includes 5 to 100 parts by weight of the copolymer having the core-shell structure based on 100 parts by weight of the thermoplastic polyurethane resin. More preferably, the thermoplastic polyurethane-based resin composition preferably includes 10 to 70 parts by weight of the copolymer having a core-shell structure, but is not particularly limited thereto. When the copolymer having the core-shell structure is included within the above-described range, it is preferable to have an effect of improving abrasion resistance, dimensional stability, molding processability, and economic efficiency.

According to an exemplary embodiment of the present invention, the intermediate layer may have a thickness of 10 to 100 μm, preferably 20 to 80 μm, but is not particularly limited thereto. It is preferable that when the intermediate layer is manufactured to have the thickness within the above-described range, a printing condition is good, and the cost competitiveness is good.

The intermediate layer according to the present invention may be manufactured by a general inflation molding method, a T-die casting method, or the like, which is the same as the surface layer film.

According to an exemplary embodiment of the present invention, as a material of the intermediate layer and the back layer sheet, the thermoplastic polyurethane resin (B) having a Shore hardness of 40 D to 80 D and a softening point of 100 to 150° C. may be used.

In the present invention, the thermoplastic polyurethane resin (B) used for the intermediate layer and the back layer sheet preferably has a Shore hardness of 40 D to 80 D. In addition, the thermoplastic polyurethane resin (B) preferably has a softening point of 100 to 150° C., preferably a softening point of 110 to 140° C., and has no relation to the transparency at all.

In the present invention, when the thermoplastic polyurethane resin (B) having the Shore hardness within the above-described range is used for the intermediate layer and the back layer sheet, a film having a high tensile modulus of elasticity may be manufactured, moldability may be improved, and a material cost may be reduced to improve economic efficiency. Further, in the present invention, when the thermoplastic polyurethane resin (B) used for the intermediate layer and the back layer sheet has the softening point range, it is possible to obtain high dimensional stability and proper hardness to achieve good walking feeling, and to reduce a material cost to improve economic efficiency. Specific examples of the thermoplastic polyurethane resin (B) satisfying these conditions to be preferably usable as the intermediate layer and the back layer sheet in the present invention may include all of thermoplastic polyurethane resins (A) usable as the surface layer film in the present invention, and further, may include Estane GP52DB (Shore hardness of 52 D, softening point of 118° C., and light transmittance of 77%) manufactured by Lubrizol, Estane GP60DB (Shore hardness of 60 D, softening point of 132° C., and light transmittance of 75%) manufactured by Lubrizol, etc.

The thermoplastic polyurethane resin (B) used in the present invention is relatively easy to be dispersed with inorganic particle, organic particle, or the copolymer having the core-shell structure without adding a special dispersant due to hydrophilicity. When a resin having a slightly low molecular weight, that is, high melt index among resins having a strength, a softening point and a light transmittance similar to those of the originally selected resin instead of the dispersant is partially mixed, it is advantageous in dispersing the inorganic particle, the organic particle or the copolymer having the core-shell structure, and molecular weight distribution may be widened to thereby improve processability of the film or sheet. In the present invention, the composition used for the intermediate layer and the back layer sheet may be manufactured and obtained in the form of a pellet in which the inorganic particle is kneaded and dispersed in the thermoplastic polyurethane resin by a kneading machine such as a single screw extruder, a biaxial screw extruder, a mixing roll, a Banbury mixer, a kneader, or the like. Preferably, the use of the biaxial screw extruder is most effective for dispersion, but is not particularly limited thereto.

According to an exemplary embodiment of the present invention, the intermediate layer and the back layer sheet are more preferable in view of dimensional stability, printing stability, arrival safety, and economic efficiency when they further include the inorganic or organic particle, but the present invention is not limited thereto.

According to an exemplary embodiment of the present invention, the back layer sheet may have a thickness of 1 to 7 mm, preferably 2.5 to 5 mm, but is not particularly limited thereto. When the back layer sheet is manufactured to have a thickness within the above-described range, it is preferable mechanical properties of the flooring material may be improved and cost competitiveness is good.

According to an exemplary embodiment of the present invention, the back layer sheet may be manufactured by a T-die casting method, or the like, but is not particularly limited thereto.

According to an exemplary embodiment of the present invention, as shown in FIG. 2, in the flooring material, the back layer sheet may be a single layer sheet or a multilayer sheet stacked in two or more layers.

The back layer sheet according to the present invention may be formed of a single layer sheet or a multilayer sheet of two or more layers. If it is difficult to manufacture a thick sheet when using a T-die casting molding machine, a plurality of sheets may be formed and a sheet having a desired thickness may be manufactured by the heat fusion method. As another reason, it is possible to manufacture a multilayer sheet of two or more layers in order to balance warpage of the floor.

According to an exemplary embodiment of the present invention, the multilayer sheet is composed of a back layer upper sheet and a back layer lower sheet. First, a surface layer film 10, a printing layer 20, and a back layer upper sheet 30(a) may be stacked by thermal fusion to manufacture a flooring material, a warpage state may be examined, and contents of the thermoplastic polyurethane resin and any one or a mixture of two or more selected from a copolymer having a core-shell structure in which a core is an elastic body and a shell is formed of an acrylic resin, an inorganic particle, and an organic particle, may be controlled to manufacture the back layer lower sheet 30(b), and then stacked with the previously laminated flooring material, thereby obtaining a final desired flooring material.

As a specific example, the back layer upper sheet 30(a) is preferably formed by including 100 to 200 parts by weight of the inorganic particle in 100 parts by weight of the thermoplastic polyurethane resin having a Shore hardness of 40 D to 80 D and a softening point of 100 to 150° C., and the back layer lower sheet 30(b) is preferably formed by including 200 to 300 parts by weight of the inorganic particle in 100 parts by weight of the thermoplastic polyurethane resin (B) having a Shore hardness of 40 D to 80 D and a softening point of 100 to 150° C. This is obtained in consideration that as the content of the inorganic particle in the composition increases, tensile modulus of elasticity of the back layer sheet 30 to be manufactured is improved, which is advantageous in preventing warpage.

The flooring material in the present invention may be blended with conventional additives such as sunscreen, an antioxidant, an antibacterial agent, an antifungal agent, a deodorant, a fragrance, and a flame retardant within a range in which an object of the present invention is not impaired.

Hereinafter, preferred embodiments of the present invention will be described to assist in understanding the present invention. However, the following Examples are provided by way of example only so that a person skilled in the art can more easily understand the present invention. Therefore, the present invention is not limited to the following Examples, but may be variously modified and changed.

Unless defined otherwise, all technical and scientific terms used herein have the same meanings generally understood by those skilled in the art to which the present invention pertains. Terms used in the specification of the present invention are merely used to effectively describe specific exemplary embodiments, but are not intended to limit the present invention.

The abrasion resistance, dimensional stability, print visibility and molding processability of flooring materials manufactured according to the following Examples and Comparative Examples were measured as follows.

In addition, unless otherwise stated in the specification, additives may be used in the unit of wt %.

Experiment 1) Abrasion Resistance

The abrasion resistance was evaluated according to the evaluation criteria shown in Table 1 based on an amount (mg) occurring due to abrasion on a surface layer of a flooring material sample under conditions of an abrasion wheel H-18, an applied load of 1 kg, and the number of abrasion times of 10,000 times, based on ASTM D3389 as a measure of abrasion resistance.

TABLE 1

| Evaluation criteria of abrasion resistance | | | | |
|---|---|---|---|---|
| Classification | ◎ (Excellent) | ○ (Good) | Δ (Normal) | X (Poor) |
| Abrasion amount (mg) | Less than 50 | 50 or more to less than 100 | 100 or more to less than 500 | 500 or more |

Experiment 2) Dimensional Stability

The dimensional stability was determined by allowing a flooring material sample to stand in a 150° C. drying oven for 10 hours, measuring a degree of decrease or increase in dimension by KS M3802 measurement, and evaluating the dimensional stability according to the evaluation criteria shown in Table 2 based on a dimensional change value (%) before and after the test.

TABLE 2

| Evaluation criteria of dimensional stability | | | | |
|---|---|---|---|---|
| Classification | ⊚ (Excellent) | ○ (Good) | Δ (Normal) | X (Poor) |
| Dimensional change value (%) | Less than 0.05 | 0.05 or more to less than 0.1 | 0.1 or more to less than 0.5 | 0.5 or more |

Experiment 3) Evaluation of Print Visibility

The print visibility was evaluated by visually observing the flooring material sample in which the printing layer was finally stacked, judging visibility, and classifying the degree into four grades (⊚ Excellent, ○ Good, Δ Normal, X Poor)

Experiment 4) Molding Processability

The molding processability was evaluated by visually judging whether a resin was processed to have a uniform thickness without being adhered to the metal roll at the time of molding a film or a sheet by a T-die casting method or a calendering method, followed by classification into four grades (⊚ Excellent, ○ Good, Δ Normal, X Poor).

Example 1

First, a thermoplastic polyurethane resin (Estane R190A manufactured by Lubrizol, TPU-A) having a Shore hardness of 47 D (or 93 A), a softening point of 125° C. and a light transmittance of 93% was prepared. The TPU-A was extrusion-molded in a T-die casting film molding machine to manufacture a surface layer film (SF-1) having a thickness of 200 μm. A wood pattern was printed on the surface layer film (SF-1) by a flexographic printing machine. As an inorganic particle, calcium carbonate-A having an average particle diameter of 1.7 μm manufactured by Omya Company was prepared. A mixture of 30 wt % of TPU-A and 70 wt % of calcium carbonate-A was added to a Henschel mixer, the mixture was injected into a twin-screw extruder having a screw diameter of 130 mm and melt-extruded, thereby preparing a composition-A pellet which is a composition in a pellet state. The composition-A pellet was put into a hopper and extrusion-molded in a T-die casting film molding machine to manufacture a back layer sheet (BS-1) having a thickness of 2.5 mm. The manufactured surface layer film (SF-1), the printing layer, and the back layer sheet (BS-1) were stacked in a laminator by thermal fusion to obtain a final flooring material sample (1). Then, the abrasion resistance, dimensional stability and print visibility of the flooring material sample 1 were evaluated.

Example 2

A final flooring material sample (2) was obtained in the same procedure as in Example 1 except that an intermediate layer was added. For the intermediate layer, a mixture of 60 wt % of TPU-A and 40 wt % of calcium carbonate-A was added to a Henschel mixer, the mixture was injected into a twin-screw extruder having a screw diameter of 130 mm and melt-extruded, thereby preparing a composition-B pellet which is a composition in a pellet state. The composition-B pellet was put into a hopper and extrusion-molded in a T-die casting film molding machine to manufacture an intermediate layer (M-1) having a thickness of 80 μm.

Example 3

A final flooring material sample (3) was obtained in the same procedure as in Example 2 except that titan paper was used as the intermediate layer of Example 2. Then, the abrasion resistance, dimensional stability and print visibility of the flooring material sample 3 were evaluated.

Example 4

A final flooring material sample (4) was obtained in the same procedure as in Example 2 except that a titan paper was used as the intermediate layer of Example 2. Then, the abrasion resistance, dimensional stability and print visibility of the flooring material sample (4) were evaluated.

Example 5

A final flooring material sample (5) was obtained in the same procedure as in Example 2 except that a surface layer film (SF-2) having a thickness of 180 μm was manufactured by using Estane S375 D (hereinafter, referred to as 'TPU-B' manufactured by Lubrizol) having a Shore hardness of 78 D, a softening point of 130° C. and a light transmittance of 92% instead of the TPU-A and an intermediate layer (M-2) having a thickness of 50 μm was manufactured by using 70 wt % of the TPU-B and 30 wt % of the calcium carbonate-A. Then, the abrasion resistance, dimensional stability and print visibility of the flooring material sample (5) were evaluated.

Example 6

A final flooring material sample 6 was obtained in the same procedure as in Example 2 except that Elastollan 1195A10 (hereinafter, referred to as 'TPU-C' manufactured by BASF) having a Shore hardness of 53 D, a softening point of 116° C. and a light transmittance of 93% instead of the TPU-A was used, and an intermediate layer (M-3) having a thickness of 50 μm was manufactured by using 50 wt % of the TPU-C and 50 wt % of the calcium carbonate-A. Then, the abrasion resistance, dimensional stability and print visibility of the flooring material sample (6) were evaluated.

Example 7

When manufacturing the intermediate layer and the back layer sheet in Example 2, talc-A (Dawon Chem Company) having an average particle diameter of 2.4 μm instead of the calcium carbonate-A was used, and when manufacturing the intermediate layer, the intermediate layer (M-3) having a thickness of 50 μm was manufactured by using 60 wt % of TPU-A and 40 wt % of talc-A. A final flooring material sample 7 was obtained in the same procedure as in Example 2 except that a back layer sheet (BS-4) having a thickness of 2 mm was manufactured by using 40 wt % of TPU-A and 60 wt % of the talc-A when manufacturing the back layer sheet. Then, the abrasion resistance, dimensional stability and print visibility of the flooring material sample (7) were evaluated.

Example 8

A final flooring material sample (8) was obtained in the same procedure as in Example 2 except that a white printing layer was added as a reflective layer between the printing layer and the intermediate layer. Then, the abrasion resistance, dimensional stability and print visibility of the flooring material sample (8) were evaluated.

Example 9

When manufacturing the back layer sheet in Example 2, a back layer upper sheet and a back layer lower sheet were independently manufactured, and when manufacturing the back layer upper sheet, a mixture including 50 wt % of TPU-A and 50 wt % of calcium carbonate-A was used to manufacture a back layer upper sheet (BS-5) having a thickness of 1 mm. A final flooring material sample 9 was obtained in the same procedure as in Example 2 except that a back layer lower sheet (BS-6) having a thickness of 1 mm was manufactured by using 30 wt % of TPU-A and 70 wt % of the talc-A when manufacturing the back layer lower sheet. Then, the abrasion resistance, dimensional stability and print visibility of the flooring material sample 9 were evaluated.

Example 10

A final flooring material sample (10) was obtained in the same procedure as in Example 9 except that an intermediate layer was added. The intermediate layer was manufactured in the same procedure as in Example 2 except that talc-A was used together with the calcium carbonate-A, and 50 wt % of TPU-A, 20 wt % of calcium carbonate-A, and 30 wt % of the talc-A were used. Then, the abrasion resistance, dimensional stability and print visibility of the flooring material sample (10) were evaluated.

Example 11

A final flooring material sample (11) was obtained in the same procedure as in Example 2 except that a white printing layer was added as a reflective layer between the printing layer and the intermediate layer. Wood patterns were printed on the surface layer film (SF-1), and then white ink was continuously printed by a gravure printing machine. Then, the abrasion resistance, dimensional stability, and print visibility of the flooring material sample (11) were evaluated.

Example 12

A final flooring material sample (12) was obtained in the same procedure as in Example 1 except that a white printing layer was added as a reflective layer between the printing layer and the back layer sheet. Wood patterns were printed on the surface layer film (SF-1), and then white ink was continuously printed by a gravure printing machine. Then, the abrasion resistance, dimensional stability, and print visibility of the flooring material sample (12) were evaluated.

Example 13

A final flooring material sample (13) was obtained in the same procedure as in Example 9 except that a white printing layer was added as a reflective layer between the printing layer and the back layer sheet. Wood patterns were printed on the surface layer film (SF-1), and then white ink was continuously printed by a gravure printing machine. Then, the abrasion resistance, dimensional stability, and print visibility of the flooring material sample (13) were evaluated.

Example 14

A final flooring material sample (14) was obtained in the same procedure as in Example 2 except that Pearlthane ECO D12T55 D (hereinafter referred to as 'TPU-D' manufactured by Lubrizol) having a Shore hardness of 55 D, a softening point of 133° C., and a light transmittance of 92% instead of the TPU-A was used. Then, the abrasion resistance, dimensional stability, and print visibility of the flooring material sample (14) were evaluated.

Comparative Example 1

A final flooring material sample (C1) was obtained in the same procedure as in Example 2 except that Estane 2103-70A (hereinafter referred to as 'TPU-E' manufactured by Lubrizol) having a Shore hardness of 24 D or 72 A, a softening point of 76° C., and a light transmittance of 93% was used instead of the TPU-A in Example 1. Then, the abrasion resistance, dimensional stability, and print visibility of the flooring material sample (C1) were evaluated.

Comparative Example 2

A final flooring material sample (C2) was obtained in the same procedure as in Example 2 except that Estane GP52DB (hereinafter referred to as 'TPU-F' manufactured by Lubrizol) having a Shore hardness of 52 D, a softening point of 118° C., and a light transmittance of 77% was used instead of the TPU-A in Example 2. Then, the abrasion resistance, dimensional stability, and print visibility of the flooring material sample (C2) were evaluated.

Comparative Example 3

A final flooring material sample (C3) was obtained in the same procedure as in Example 2 except that Estane 2103-85AE (hereinafter referred to as 'TPU-H' manufactured by Lubrizol) having a Shore hardness of 47 D or 88 A, a softening point of 67° C., and a light transmittance of 93% instead of the TPU-A was used. Then, the abrasion resistance, dimensional stability, and print visibility of the flooring material sample (C3) were evaluated.

Comparative Example 4

A final flooring material sample (C4) was obtained in the same procedure as in Comparative Example 3 except that a titan paper was used as the intermediate layer. Then, the abrasion resistance, dimensional stability, and print visibility of the flooring material sample (C4) were evaluated.

Comparative Example 5

Polyvinyl chloride (PVC; LG Chem., Ltd., product name LS100) and dioctyl phthalate (DOP; LG Chem., Ltd.) were prepared as raw materials of the surface layer film. A surface layer film (SF-C4) having a thickness of 200 µm was manufactured by performing a calendaring method using a mixture of 70 wt % of PVC and 30 wt % of DOP. An intermediate layer (M-C3) having a thickness of 80 µm was manufactured by performing a calendering method using a mixture of 40 wt % of PVC, 20 wt % of DOP and 40 wt % of calcium carbonate-A. A wood pattern was printed on the surface layer film (SF-C4) by a flexographic printing machine. Further, a back layer sheet (BS-C3) having a thickness of 2.5 mm was manufactured by performing a calendaring method using a mixture of 20 wt % of PVC, 10 wt % of DOP and 70 wt % of calcium carbonate-A. The obtained surface layer film (SF-C4), the printing layer, the intermediate layer (M-C3), and the back layer sheet (BS-C3) were stacked in a laminator by thermal fusion to obtain a final flooring material sample (C5). Then, the abrasion resistance, dimensional stability, and print visibility of the flooring material sample (C5) were evaluated.

Comparative Example 6

A final flooring material sample (C6) was obtained in the same procedure as in Comparative Example 6 except that the intermediate layer was not used. Then, the abrasion resistance, dimensional stability, and print visibility of the flooring material sample (C6) were evaluated.

Comparative Example 7

The same procedure as in Example 2 was performed except that an epoxidized soybean oil (ESO manufactured by Sajohaepyo Corporation) was further used as a softener with respect to the thermoplastic polyurethane resin. A final flooring material sample (C7) was obtained in the same procedure as in Example 2 except that when manufacturing the surface layer film, 80 wt % of the TPU-A and 20 wt % of the ESO were used, when manufacturing the intermediate layer, 55 wt % of the TPU-A, 15 wt % of the ESO, 30 wt % of the calcium carbonate-A were used, and when manufacturing the back layer sheet, 24 wt % of the TPU-A, 6 wt % of the ESO, and 70 wt % of the calcium carbonate-A were used. Then, the abrasion resistance, dimensional stability, and print visibility of the flooring material sample (C7) were evaluated.

To help understand the present invention, constitutions of the flooring material samples manufactured by Examples 1 to 14 and Comparative Examples 1 to 7 of the present invention are shown in Table 3 below.

In addition, results obtained by evaluating the abrasion resistance, the dimensional stability and the print visibility of the flooring material samples evaluated through the methods of Experiments 1) to 3) in Examples 1 to 14 and Comparative Examples 1 to 7 are shown in Table 4 below.

TABLE 3

| Classification | | Constitution for each layer | | |
| --- | --- | --- | --- | --- |
| | | Surface layer | Intermediate layer | Back layer |
| Example 1 | Composition (wt %) | TPU-A 100 | — | TPU-A 30, Calcium carbonate-A 70 |
| | Thickness | 200 μm | — | 2.5 mm |
| Example 2 | Composition (wt %) | TPU-A 100 | TPU-A 60, Calcium carbonate-A 40 | TPU-A 30, Calcium carbonate-A 70 |
| | Thickness | 200 μm | 80 μm | 2.5 mm |
| Example 3 | Composition (wt %) | TPU-A 100 | Titan paper | TPU-A 30, Calcium carbonate-A 70 |
| | Thickness | 200 μm | 80 μm | 2.5 mm |
| Example 4 | Composition (wt %) | TPU-A 100 | Graft paper | TPU-A 30, Calcium carbonate-A 70 |
| | Thickness | 200 μm | 80 μm | 2.5 mm |
| Example 5 | Composition (wt %) | TPU-B 100 | TPU-B 70, Calcium carbonate-A 30 | TPU-B 30, Calcium carbonate-A 70 |
| | Thickness | 180 μm | 80 μm | 2.5 mm |
| Example 6 | Composition (wt %) | TPU-C 100 | TPU-C 50, Calcium carbonate-A 50 | TPU-C 30, Calcium carbonate-A 70 |
| | Thickness | 200 μm | 50 μm | 2.5 mm |
| Example 7 | Composition (wt %) | TPU-A 100 | TPU-A 60, Talc-A 40 | TPU-A 40, Talc-A 60 |
| | Thickness | 200 μm | 40 μm | 2 mm |
| Example 8 | Composition (wt %) | TPU-A 100 | Titan paper White printing layer | TPU-A 30, Calcium carbonate-A 70 |
| | Thickness | 200 μm | 80 μm | 2 mm |
| Example 9 | Composition (wt %) | TPU-A 100 | — | [Upper]TPU-A 50, Calcium carbonate-A 50 [Lower]TPU-A 30, Talc-A 70 |
| | Thickness | 200 μm | — | 2 mm |
| Example 10 | Composition (wt %) | TPU-A 100 | TPU-A 60, Calcium carbonate-A 40 | [Upper]TPU-A 50, Calcium carbonate-A 20 talc-A30, [Lower]TPU-A 30, talc-A 70 |
| | Thickness | 200 μm | 80 μm | Upper/lower (1 mm/1 mm) |
| Example 11 | Composition (wt %) | TPU-A 100 | TPU-A 60, Calcium | TPU-A 30, Calcium |

TABLE 3-continued

| Classification | | Surface layer | Intermediate layer | Back layer |
|---|---|---|---|---|
| Example 12 | Thickness<br>Composition<br>(wt %) | 200 μm<br>TPU-A 100 | 80 μm<br>White printing layer<br>carbonate-A 40<br>White printing layer | 2.5 mm<br>TPU-A 30,<br>Calcium<br>carbonate-A 70 |
| Example 13 | Thickness<br>Composition<br>(wt %) | 200 μm<br>TPU-A 100 | —<br>White printing layer | 2.5 mm<br>[Upper] TPU-A 50,<br>Calcium<br>carbonate-A 20<br>Talc-A 30,<br>[Lower] TPU-A 30,<br>Talc-A 70 |
| Example 14 | Thickness<br>Composition<br>(wt %) | 200 μm<br>TPU-D 100 | —<br>TPU-D 70,<br>Calcium<br>carbonate-A 30 | Upper/lower<br>(1 mm/1 mm)<br>TPU-D 30,<br>Calcium<br>carbonate-A 70 |
| Comparative Example 1 | Composition<br>(wt %)<br>Composition<br>(wt %) | 200 μm<br>TPU-E 100 | 80 μm<br>— | 2.5 mm<br>TPU-E 30,<br>Calcium<br>carbonate-A 70 |
| Comparative Example 2 | Thickness<br>Composition<br>(wt %) | 200 μm<br>TPU-F 100 | TPU-F 60,<br>Calcium<br>carbonate-A 40 | 2.5 mm<br>TPU-F 30,<br>Calcium<br>carbonate-A 70 |
| Comparative Example 3 | Thickness<br>Composition<br>(wt %) | 200 μm<br>TPU-G 100 | 50 μm<br>TPU-G 60,<br>Calcium<br>carbonate-A 40 | 2.5 mm<br>TPU-G 30,<br>Calcium<br>carbonate-A 70 |
| Comparative Example 4 | Thickness<br>Composition<br>(wt %) | 200 μm<br>TPU-H 100 | 50 μm<br>Titan paper | 2.5 mm<br>TPU-H 30,<br>Calcium<br>carbonate-A 70 |
| Comparative Example 5 | Thickness<br>Composition<br>(wt %) | 200 μm<br>PVC 70<br>DOP 30 | 80 μm<br>PVC 40,<br>DOP 20,<br>Calcium<br>carbonate-A 60, | 2.5 mm<br>PVC 20,<br>DOP 10,<br>Calcium<br>carbonate-A 70 |
| Comparative Example 6 | Thickness<br>Composition<br>(wt %) | 200 μm<br>PVC 70<br>DOP 30 | 80 μm<br>— | 2.5 mm<br>PVC 20,<br>DOP 10,<br>Calcium<br>carbonate-A 70 |
| Comparative Example 7 | Thickness<br>Composition<br>(wt %)<br>Thickness | 200 μm<br>TPU-A 80<br>ESO 20<br>200 μm | —<br>TPU-A 55,<br>ESO 15,<br>Calcium<br>carbonate-A 30<br>80 μm | 2.5 mm<br>TPU-A 24,<br>ESO 6,<br>Calcium<br>carbonate-A 70<br>2.5 mm |

TABLE 4

| | Physical properties | | | | |
|---|---|---|---|---|---|
| | Abrasion resistance | | Dimensional stability | | |
| Classification | Abrasion amount (mg) | Evaluation | Dimensional change value (%) | Evaluation | Print visibility |
| Example 1 | 15 | ☺ | 0.01 | ☺ | ○ |
| Example 2 | 18 | ☺ | 0.02 | ☺ | ○ |
| Example 3 | 20 | ☺ | 0.02 | ☺ | ○ |
| Example 4 | 21 | ☺ | 0.03 | ☺ | ○ |
| Example 5 | 9 | ☺ | 0.04 | ☺ | ○ |
| Example 6 | 10 | ☺ | 0.01 | ☺ | ○ |
| Example 7 | 22 | ☺ | 0.01 | ☺ | ☺ |
| Example 8 | 19 | ☺ | 0.02 | ☺ | ○ |
| Example 9 | 23 | ☺ | 0.01 | ☺ | ○ |

TABLE 4-continued

|  | Physical properties | | | | |
| --- | --- | --- | --- | --- | --- |
|  | Abrasion resistance | | Dimensional stability | | |
| Classification | Abrasion amount (mg) | Evaluation | Dimensional change value (%) | Evaluation | Print visibility |
| Example 10 | 25 | ◎ | 0.01 | ◎ | ○ |
| Example 11 | 18 | ◎ | 0.02 | ◎ | ◎ |
| Example 12 | 16 | ◎ | 0.01 | ◎ | ◎ |
| Example 13 | 17 | ◎ | 0.02 | ◎ | ◎ |
| Example 14 | 20 | ◎ | 0.01 | ◎ | ◎ |
| Comparative Example 1 | 500 | X | 1.90 | X | ○ |
| Comparative Example 2 | 53 | ○ | 0.09 | ○ | X |
| Comparative Example 3 | 51 | ○ | 2.90 | X | ○ |
| Comparative Example 4 | 55 | ○ | 2.85 | X | ◎ |
| Comparative Example 5 | 1,270 | X | 0.48 | Δ | ○ |
| Comparative Example 6 | 1,119 | X | 0.40 | Δ | ○ |
| Comparative Example 7 | 982 | X | 3.95 | X | ○ |

As shown in Table 4, the flooring material of Comparative Example 2 using a thermoplastic polyurethane resin having a high surface hardness and a high softening point but a low light transmittance in the surface layer film was confirmed to have excellent abrasion resistance and dimensional stability, but poor print visibility. Further, the flooring material of Comparative Example 3 using a thermoplastic polyurethane resin having a high surface hardness and a high light transmittance but a low softening point was confirmed to have excellent abrasion resistance and print visibility but poor dimensional stability. In addition, it was confirmed in Comparative Example 4 that when a titan paper was used, the print visibility was improved, but the dimensional stability was poor. Further, the flooring material of Comparative Example 1 using a thermoplastic polyurethane resin having a high light transmittance but a low surface hardness and a low softening point was confirmed to have excellent print visibility but poor abrasion resistance and dimensional stability. On the other hand, it could be appreciated that the flooring materials according to Examples 1 to 14 of the present invention all had excellent abrasion resistance, dimensional stability, and print visibility.

When comparing the flooring materials of Comparative Examples 5 to 7 manufactured by performing the calendaring method using the PVC and the plasticizer and the flooring material of Comparative Example 8 manufactured by using the thermoplastic polyurethane resin and the softener with the flooring material of Example 1 of the present invention, it could be appreciated that the flooring material of the present invention was relatively excellent in abrasion resistance and dimensional stability.

Example 15

First, a thermoplastic polyurethane resin (grade Estane S1364 D manufactured by Lubrizol, hereinafter referred to as 'TPU-I') having a Shore hardness of 65 D, a softening point of 123° C. and a light transmittance of 92% was prepared as a thermoplastic polyurethane resin. In addition, a copolymer (Grade EM700 manufactured by LG Chem., Ltd., copolymer-A) having a refractive index of 1.543 and an average particle diameter of 150 nm, and having a core-shell structure in which a core is a styrene-butadiene rubber and a shell is formed of a polymethyl methacrylate resin, was prepared.

A mixture of 100 parts by weight of TPU-I and 20 parts by weight of copolymer-A was added and mixed in a Henschel mixer, the mixture was injected into a twin-screw extruder having a screw diameter of 130 mm and melt-extruded, thereby preparing a composition-C pellet which is a composition in a pellet state. The composition-C pellet was subjected to extrusion-molding in a T-die casting film molding machine, thereby manufacturing a surface layer film (SF-5) having a thickness of 150 μm. A wood pattern was printed on the surface layer film (SF-5) by a gravure printing machine.

A mixture of 100 parts by weight of TPU-I and 90 parts by weight of copolymer-A was added and mixed in a Henschel mixer, and melt-extruded in the same method as above, thereby preparing a composition-D pellet which is a composition in a pellet state. The composition-D pellet was subjected to a calendaring method in a calendering sheet molding machine, thereby manufacturing a back layer sheet (BS-9) having a thickness of 3 mm.

The manufactured surface layer film (SF-5), the printing layer, and the back layer sheet (BS-9) were stacked in a laminator by thermal fusion to obtain a final flooring material sample (15). Then, the abrasion resistance, dimensional stability, and molding processability of the flooring material sample (15) were evaluated.

Example 16

A final flooring material sample (16) was obtained in the same manner as in Example 15 except that an intermediate layer was added. For the intermediate layer, a mixture of 100 parts by weight of TPU-I and 30 parts by weight of copolymer-A was added and mixed in a Henschel mixer, and melt-extruded in the same method as above, thereby preparing a composition-M pellet which is a composition in a pellet state. The composition-M pellet was used and extrusion-molded in a T-die casting film molding machine to manufacture an intermediate layer (M-5) having a thickness of 80 μm. Then, the abrasion resistance, dimensional stability, and molding processability of the flooring material sample (16) were evaluated.

Example 17

100 parts by weight of TPU-I and 50 parts by weight of copolymer-A were mixed to manufacture a surface layer film (SF-6) having a thickness of 150 μm. 100 parts by weight of TPU-I and 40 parts by weight of copolymer-A were mixed to manufacture an intermediate film (M-6) having a thickness of 80 μm. 60 parts by weight of TPU-I, 40 parts by weight the copolymer-A, and 350 parts by weight of calcium carbonate-A having an average particle diameter of 1.7 μm manufactured by Omya Company were mixed to manufacture a back layer sheet (BS-10) having a thickness of 2.5 mm. Other procedure was performed in the same manner as in Example 16 to obtain a final flooring material sample (17). Then, the abrasion resistance, dimensional stability, and molding processability of the flooring material sample (17) were evaluated.

Example 18

Estane S375 D (hereinafter referred to as 'TPU-J' manufactured by Lubrizol) having a Shore hardness of 78 D, a softening point of 130° C. and a light transmittance of 92% instead of the TPU-I in Example 16 was used. 100 parts by weight of TPU-B and 80 parts by weight of copolymer-A were mixed to manufacture a surface layer film (SF-7) having a thickness of 150 μm. 60 parts by weight of TPU-J, 40 parts by weight of copolymer-A, and 40 parts by weight of calcium carbonate-A were mixed to manufacture an intermediate film (M-7) having a thickness of 80 μm. 60 parts by weight of TPU-J, 40 parts by weight of copolymer-A, and 300 parts by weight of calcium carbonate-A were mixed to manufacture a back layer sheet (BS-11) having a thickness of 2.5 mm. Other procedures were performed in the same manner as in Example 16 to obtain a final flooring material sample (18). Then, the abrasion resistance, dimensional stability, and print visibility of the flooring material sample (18) were evaluated.

Example 19

A copolymer (Grade IM808 manufactured by LG Chem., Ltd., copolymer-B) having a refractive index of 1.540 and an average particle size of 200 nm, and having a core-shell structure in which a core is a butylacrylate rubber and a shell is formed of a polymethyl methacrylate resin, was prepared instead of the copolymer-A in Example 16. 100 parts by weight of TPU-J and 40 parts by weight of copolymer-B were mixed to manufacture a surface layer film (SF-8) having a thickness of 100 μm. 70 parts by weight of TPU-I, 30 parts by weight of copolymer-A, and 40 parts by weight of calcium carbonate-A were mixed to manufacture an intermediate film (M-8) having a thickness of 50 μm. 50 parts by weight of TPU-I, 50 parts by weight of copolymer-B, and 300 parts by weight of calcium carbonate-A were mixed to manufacture a back layer sheet (BS-12) having a thickness of 2.5 mm. Other procedures were performed in the same manner as in Example 16 to obtain a final flooring material sample (19). Then, the abrasion resistance, dimensional stability, and print visibility of the flooring material sample (19) were evaluated.

Example 20

100 parts by weight of TPU-J and 40 parts by weight of copolymer-B were mixed to manufacture a surface layer film (SF-9) having a thickness of 150 μm. A copolymer (Grade IM813 manufactured by LG Chem., Ltd., copolymer-C) having a refractive index of 1.48 and an average particle size of 300 nm, and having a core-shell structure in which a core is a styrene-butadiene rubber and a shell is formed of a polymethyl methacrylate-styrene copolymer resin, was prepared instead of the copolymer-A in Example 16. 70 parts by weight of TPU-J, 30 parts by weight of copolymer-C, and 35 parts by weight of calcium carbonate-A were mixed to manufacture an intermediate film (M-9) having a thickness of 50 μm.

When manufacturing the back layer sheet in Example 16, a back layer upper sheet and a back layer lower sheet were independently manufactured, and when manufacturing the back layer upper sheet, a mixture including 70 parts by weight of TPU-B, 30 parts by weight of the copolymer-C, and 100 parts by weight of calcium carbonate-A was used to manufacture a back layer upper sheet (BS-13) having a thickness of 1.5 mm. In addition, talc-A (Dawon Chem Company) having an average particle diameter of 2.4 μm was prepared. 60 parts by weight of TPU-B, 40 parts by weight of copolymer-C, and 250 parts by weight of talc-A were mixed to manufacture a back layer lower sheet (BS-14) having a thickness of 1.5 mm. Other procedures were performed in the same manner as in Example 16 to obtain a final flooring material sample (20). Then, the abrasion resistance, dimensional stability, and molding processability of the flooring material sample (20) were evaluated.

Example 21

100 parts by weight of TPU-I and 60 parts by weight of copolymer-A were mixed to manufacture a surface layer film (SF-10) having a thickness of 200 μm. A wood pattern was printed on the surface layer film (SF-8) by a gravure printing machine. 60 parts by weight of TPU-J, 40 parts by weight of copolymer-C, 200 parts by weight of calcium carbonate-A, and 100 parts by weight of talc-A were mixed to manufacture a back layer sheet (BS-15) having a thickness of 2.5 mm. Other procedures were performed in the same manner as in Example 15 to obtain a final flooring material sample (21). Then, the abrasion resistance, dimensional stability, and molding processability of the flooring material sample (21) were evaluated.

Example 22

100 parts by weight of TPU-J and 65 parts by weight of copolymer-B were mixed to manufacture a surface layer film (SF-11) having a thickness of 200 μm. 70 parts by weight of TPU-J, 30 parts by weight of copolymer-C, and 200 parts by weight of calcium carbonate-A were mixed to manufacture a back layer upper sheet (BS-16) having a thickness of 2 mm. 60 parts by weight of TPU-J, 40 parts by weight of copolymer-C, and 350 parts by weight of talc-A were mixed to manufacture a back layer lower sheet (BS-17) having a thickness of 1 mm. Other procedures were performed in the same manner as in Example 15 to obtain a final flooring material sample (22). Then, the abrasion resistance, dimensional stability, and molding processability of the flooring material sample (22) were evaluated.

Example 23

A final flooring material sample (23) was obtained in the same procedure as in Example 16 except that an intermediate layer (M-10) having a thickness of 80 μm manufactured by mixing 60 wt % of TPU-J and 40 wt % of calcium carbonate-A was used. Then, the abrasion resistance, dimensional stability, and molding processability of the flooring material sample (23) were evaluated.

Example 24

A final flooring material sample (24) was obtained in the same procedure as in Example 16 except that a titan paper was used as the intermediate layer in Example 16. Then, the abrasion resistance, dimensional stability, and molding processability of the flooring material sample (24) were evaluated.

Example 25

A final flooring material sample (25) was obtained in the same procedure as in Example 16 except that a graft paper was used as the intermediate layer in Example 16. Then, the abrasion resistance, dimensional stability, and molding processability of the flooring material sample (25) were evaluated.

Example 26

A final flooring material sample (26) was obtained in the same procedure as in Example 16 except that a white printing layer was added as a reflective layer between the printing layer and the intermediate layer. Wood patterns were printed on the surface layer film (SF-5), and then white ink was continuously printed by a gravure printing machine. Then, the abrasion resistance, dimensional stability, and molding processability of the flooring material sample (26) were evaluated.

Example 27

A final flooring material sample (27) was obtained in the same procedure as in Example 16 except that Pearlthane ECO D12T55 D (hereinafter referred to as 'TPU-K' manufactured by Lubrizol) having a Shore hardness of 55 D, a softening point of 133° C., and a light transmittance of 92% instead of the TPU-A was used. Then, the abrasion resistance, dimensional stability, and molding processability of the flooring material sample (27) were evaluated.

Comparative Example 8

A final flooring material sample (C8) was obtained in the same procedure as in Example 16 except that Estane 2103-85AE (hereinafter referred to as 'TPU-C' manufactured by Lubrizol) having a Shore hardness of 47 D or 88 A, a softening point of 67° C., and a light transmittance of 93% instead of the TPU-A was used. Then, the abrasion resistance, dimensional stability, and molding processability of the flooring material sample (C8) were evaluated.

Comparative Example 9

A final flooring material sample (C9) was obtained in the same procedure as in Example 16 except that Estane 2103-70A (hereinafter referred to as 'TPU-L' manufactured by Lubrizol) having a Shore hardness of 24 D or 72 A, a softening point of 76° C., and a light transmittance of 93% instead of the TPU-A was used. Then, the abrasion resistance, dimensional stability, and molding processability of the flooring material sample (C9) were evaluated.

To help understand the present invention, constitutions of the flooring material samples manufactured by Examples 15 to 27 and Comparative Examples 8 to 9 of the present invention are shown in Table 5 below.

In addition, results obtained by evaluating the abrasion resistance, the dimensional stability and the molding processability of the flooring material samples based on the evaluation methods in Examples 15 to 27 and Comparative Examples 8 to 9 are shown in Table 6 below.

TABLE 5

| Classification | | Constitution for each layer | | |
| --- | --- | --- | --- | --- |
| | | Surface layer film | Intermediate layer | Back layer sheet |
| Example 15 | Composition (part by weight) | TPU-I 100 copolymer-A 20 | — | TPU-I 100 copolymer-A 90 |
| | Thickness | 150 μm | — | 2.5 mm |
| Example 16 | Composition (part by weight) | TPU-I 100 copolymer-A 20 | TPU-I 100 copolymer-A 30 | TPU-I 100 copolymer-A 90 |
| | Thickness | 150 μm | 80 μm | 2.5 mm |
| Example 17 | Composition (part by weight) | TPU-I 100 copolymer-A 50 | TPU-I 100 copolymer-A 40 | TPU-I 60 copolymer-A 40 calcium carbonate-A 350 |
| | Thickness | 150 μm | 80 μm | 2.5 mm |
| Example 18 | Composition (part by weight) | TPU-J 100 copolymer-A 80 | TPU-J 60 copolymer-A 40 calcium carbonate-A 40 | TPU-J 60 copolymer-A 40 calcium carbonate-A 300 |
| | Thickness | 150 μm | 80 μm | 2.5 mm |
| Example 19 | Composition (part by weight) | TPU-J 100 copolymer-B 70 | TPU-I 70 copolymer-B 30 calcium carbonate-A 40 | TPU-I 50 copolymer-B 50 calcium carbonate-A 300 |
| | Thickness | 100 μm | 50 μm | 2.5 mm |
| Example 20 | Composition (part by weight) | TPU-J 100 copolymer-B 40 | TPU-J 70 copolymer-C 30 calcium carbonate-A 35 | [Upper] TPU-J 70 copolymer-C 30 calcium carbonate-A 100 |

TABLE 5-continued

| | | Constitution for each layer | | |
|---|---|---|---|---|
| | Classification | Surface layer film | Intermediate layer | Back layer sheet |
| | Thickness | 150 μm | 50 μm | [Lower] TPU-J 60 copolymer-C 40 talc-A 250 Upper/lower (1.5 mm/1.5 mm) |
| Example 21 | Composition (part by weight) | TPU-I 100 copolymer-A 60 | — | TPU-J 60 copolymer-C 40 calcium carbonate-A 200 talc-A 100 |
| | Thickness | 200 μm | — | 2.5 mm |
| Example 22 | Composition (part by weight) | TPU-J 100 copolymer-B 65 | — | [Upper] TPU-J 70 copolymer-C 30 calcium carbonate-A 200 [Lower] TPU-J 60 copolymer-C 40 talc-A350 |
| | Thickness | 200 μm | — | Upper/lower (2 mm/1 mm) |
| Example 23 | Composition (part by weight) | TPU-I 100 copolymer-A 20 | TPU-I 60, calcium carbonate-A 40 | TPU-I 100 copolymer-A 90 |
| | Thickness | 150 μm | 80 μm | 2.5 mm |
| Example 24 | Composition (part by weight) | TPU-I 100 copolymer-A 20 | Titan paper | TPU-I 100 copolymer-A 90 |
| | Thickness | 150 μm | 80 μm | 2.5 mm |
| Example 25 | Composition (part by weight) | TPU-I 100 copolymer-A 20 | Graft paper | TPU-I 100 copolymer-A 90 |
| | Thickness | 150 μm | 80 μm | 2.5 mm |
| Example 26 | Composition (part by weight) | TPU-I 100 copolymer-A 20 | TPU-I 100 copolymer-A 30 white printing layer | TPU-I 100 copolymer-A 90 |
| | Thickness | 150 μm | 80 μm | 2.5 mm |
| Example 27 | Composition (part by weight) | TPU-J 100 copolymer-A 20 | TPU-J 100 copolymer-A 30 | TPU-J 100 copolymer-A 90 |
| | Thickness | 150 μm | 80 μm | 2.5 mm |
| Comparative Example 8 | Composition (part by weight) | TPU-K 100 copolymer-A 20 | TPU-K 100 copolymer-A 30 | TPU-K 100 copolymer-A 90 |
| | Thickness | 150 μm | 80 μm | 2.5 mm |
| Comparative Example 9 | Composition (part by weight) | TPU-L 100 copolymer-A 20 | TPU-L 100 copolymer-A 30 | TPU-L 100 copolymer-A 90 |
| | Thickness | 150 μm | 80 μm | 2.5 mm |

TABLE 6

| | Physical properties | | | | |
|---|---|---|---|---|---|
| | Abrasion resistance | | Dimensional stability | | |
| Classification | Abrasion amount (mg) | Evaluation | Dimensional change value (%) | Evaluation | Molding processability |
| Example 15 | 30 | ⊚ | 0.03 | ⊚ | ⊚ |
| Example 16 | 31 | ⊚ | 0.04 | ⊚ | ⊚ |
| Example 17 | 19 | ⊚ | 0.02 | ⊚ | ⊚ |
| Example 18 | 10 | ⊚ | 0.01 | ⊚ | ⊚ |
| Example 19 | 5 | ⊚ | 0.01 | ⊚ | ⊚ |
| Example 20 | 15 | ⊚ | 0.01 | ⊚ | ⊚ |
| Example 21 | 21 | ⊚ | 0.01 | ⊚ | ⊚ |
| Example 22 | 8 | ⊚ | 0.01 | ⊚ | ⊚ |
| Example 23 | 17 | ⊚ | 0.03 | ⊚ | ⊚ |
| Example 24 | 22 | ⊚ | 0.02 | ⊚ | ⊚ |
| Example 25 | 24 | ⊚ | 0.02 | ⊚ | ⊚ |
| Example 26 | 29 | ⊚ | 0.04 | ⊚ | ⊚ |
| Example 27 | 17 | ⊚ | 0.01 | ⊚ | ⊚ |
| Comparative Example 8 | 51 | ○ | 2.90 | X | ○ |
| Comparative Example 9 | 500 | X | 1.90 | X | ○ |

As compared to the flooring materials of Comparative Examples 5 and 6 manufactured by performing the calendering method using the PVC and plasticizer and Comparative Example 7 manufactured by performing the calendering method using the thermoplastic polyurethane resin and the softener, it could be appreciated that the flooring materials of the Examples of the present invention had relatively and remarkably excellent abrasion resistance and dimensional stability.

Further, it could be appreciated that the Examples of the present invention using the thermoplastic polyurethane-based resin composition in which the thermoplastic polyurethane resin is mixed with the copolymer having the core-shell structure in which the core is an elastic body and the shell is formed of an acrylic resin had more excellent abrasion resistance and dimensional stability and remarkable molding processability.

Further, the flooring material of Comparative Example 8 using the thermoplastic polyurethane resin having a high surface hardness and a high light transmittance but a low softening point was confirmed to have excellent abrasion resistance and print visibility but poor dimensional stability. The flooring material of Comparative Example 9 using a thermoplastic polyurethane resin having a high light transmittance but a low surface hardness and a low softening point was confirmed to have excellent molding processability but poor abrasion resistance and dimensional stability. On the other hand, it could be appreciated that the flooring materials according to Examples 15 to 27 of the present invention all had excellent abrasion resistance, dimensional stability, and molding processability.

Hereinabove, although the recyclable environment-friendly flooring material of the present invention is described by specific matters and limited exemplary embodiments, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the claims to be described below as well as all modified equally or equivalently to the claims are intended to fall within the scopes and spirit of the present invention.

The invention claimed is:

1. An environment-friendly flooring material formed by sequentially stacking a surface layer film, a printing layer, and a back layer sheet from an upper part,
wherein the surface layer film includes a thermoplastic polyurethane resin (A) having a Shore hardness of 40 D to 80 D, a softening point of 100° C. to 150° C., and a light transmittance of 90% or more, and
the back layer sheet includes a thermoplastic polyurethane resin (B) having a Shore hardness of 40 D to 80 D and a softening point of 100° C. to 150° C.

2. The environment-friendly flooring material of claim 1, wherein the surface layer film and the back layer sheet further include any one or a mixture of two or more selected from a copolymer having a core-shell structure in which a core is an elastic body and a shell is formed of an acrylic resin, an inorganic particle, and an organic particle.

3. The environment-friendly flooring material of claim 2, wherein the elastic body is rubber or elastomer.

4. The environment-friendly flooring material of claim 2, wherein the elastic body is any one or two or more selected from the group consisting of butadiene rubber, styrene-butadiene rubber, styrene-butadiene-styrene rubber, acrylonitrile rubber, acrylonitrile-butadiene rubber, butyl acrylate rubber, ethylene-propylene-diene rubber, ethylene-propylene rubber, and styrene-propylene rubber.

5. The environment-friendly flooring material of claim 2, wherein the acrylic resin is an acrylic polymer including an acrylic monomer alone or an aromatic vinyl compound-acrylic copolymer including 60 to 99.9 mol % of the acrylic monomer and 0.1 to 40 mol % of an aromatic vinyl compound.

6. The environment-friendly flooring material of claim 5, wherein the acrylic monomer is any one or two or more selected from the group consisting of methyl methacrylate, methyl acrylate, ethyl methacrylate, ethyl acrylate, ethylhexyl acrylate, methyl ethacrylate, ethyl ethacrylate, isopropyl methacrylate, isopropyl acrylate, propyl methacrylate, propyl acrylate, isobutyl methacrylate, isobutyl acrylate, butyl methacrylate, butyl acrylate, and 2-hydroxyethyl methacrylate.

7. The environment-friendly flooring material of claim 5, wherein the aromatic vinyl compound is any one or two or more selected from the group consisting of styrene, p-chlorostyrene, p-tert-butylstyrene, α-methylstyrene, p-methylstyrene, vinylnaphthalene and vinylanthracene.

8. The environment-friendly flooring material of claim 2, wherein the copolymer having a core-shell structure has an average particle size of 10 to 10,000 nm.

9. The environment-friendly flooring material of claim 2, wherein the copolymer having a core-shell structure has a refractive index of 1.5 to 1.6.

10. The environment-friendly flooring material of claim 2, wherein the inorganic particle is selected from the group consisting of talc, calcium carbonate, clay, kaolin, silica, diatomaceous earth, magnesium carbonate, calcium chloride, calcium sulfate, aluminum hydroxide, zinc oxide, magnesium hydroxide, titanium dioxide, alumina, mica, asbestos, zeolite, silicate clay, glass fiber, and whisker, and
the organic particle is any one or two or more selected from the group consisting of wood powder, rice hull powder, paper powder, and cellulose-based natural fiber powder.

11. The environment-friendly flooring material of claim 1, wherein the environment-friendly flooring material further includes an intermediate layer between the printing layer and the back layer sheet, and the intermediate layer includes a film including the thermoplastic polyurethane resin (B) having a Shore hardness of 40 D to 80 D and a softening point of 100° C. to 150° C. and an inorganic particle; paper; or a thermoplastic polyurethane-based resin composition including the thermoplastic polyurethane resin (B) and a copolymer having a core-shell structure in which a core is an elastic body and a shell is formed of an acrylic resin.

12. The environment-friendly flooring material of claim 11, wherein the paper is selected from vellum paper, art paper, snow white, tissue paper, graft paper, titan paper, linter paper, Wood-free Paper, medium quality paper, coated paper, sheepskin paper, and Japanese paper.

13. The environment-friendly flooring material of claim 11, wherein the surface layer film and the intermediate layer are manufactured by an inflation molding method or a T-die casting method.

14. The environment-friendly flooring material of claim 11, further comprising:
a reflective layer between the printing layer and the intermediate layer.

15. The environment-friendly flooring material of claim 1, wherein the thermoplastic polyurethane resin is any one or two or more selected from the group consisting of an ester-based thermoplastic polyurethane resin, an ether-based thermoplastic polyurethane resin, and a carbonate-based thermoplastic polyurethane resin.

16. The environment-friendly flooring material of claim 2, wherein the back layer sheet is a single layer sheet or a multilayer sheet stacked in two or more layers.

17. The environment-friendly flooring material of claim 1, wherein the back layer sheet is manufactured by a T-die casting method.

18. The environment-friendly flooring material of claim 1, further comprising a reflective layer between the printing layer and the back layer sheet.

* * * * *